(12) United States Patent
Reynolds et al.

(10) Patent No.: US 11,434,333 B2
(45) Date of Patent: Sep. 6, 2022

(54) METHODS OF PRODUCING AN ELASTOMER COMPOUND AND ELASTOMER COMPOUNDS

(71) Applicant: Cabot Corporation, Boston, MA (US)

(72) Inventors: David C. Reynolds, Winchester, MA (US); Gerald D. Adler, Charlestown, MA (US); Martin C. Green, Boxborough, MA (US)

(73) Assignee: Cabot Corporation, Boston, MA (US)

( * ) Notice: Subject to any disclaimer, the term of this patent is extended or adjusted under 35 U.S.C. 154(b) by 172 days.

(21) Appl. No.: 16/761,344

(22) PCT Filed: Nov. 8, 2018

(86) PCT No.: PCT/US2018/059762
§ 371 (c)(1),
(2) Date: May 4, 2020

(87) PCT Pub. No.: WO2019/094551
PCT Pub. Date: May 16, 2019

(65) Prior Publication Data
US 2021/0179789 A1    Jun. 17, 2021

Related U.S. Application Data

(60) Provisional application No. 62/584,588, filed on Nov. 10, 2017.

(51) Int. Cl.
| | |
|---|---|
| *C08J 3/22* | (2006.01) |
| *C08J 3/20* | (2006.01) |
| *C08K 3/04* | (2006.01) |
| *C08K 3/22* | (2006.01) |
| *C08K 3/36* | (2006.01) |
| *C08K 9/02* | (2006.01) |
| *C08L 7/02* | (2006.01) |
| *C08L 9/10* | (2006.01) |
| *B01F 23/70* | (2022.01) |

(52) U.S. Cl.
CPC ............. *C08J 3/226* (2013.01); *B01F 23/704* (2022.01); *C08J 3/203* (2013.01); *C08K 3/04* (2013.01); *C08K 3/22* (2013.01); *C08K 3/36* (2013.01); *C08K 9/02* (2013.01); *C08L 7/02* (2013.01); *C08L 9/10* (2013.01); *C08K 2003/2227* (2013.01); *C08K 2003/2296* (2013.01); *C08L 2205/02* (2013.01)

(58) Field of Classification Search
CPC .. C08J 3/203; C08J 3/226; C08K 3/04; C08K 3/22; C08K 3/36; C08K 9/02; C08L 7/02; C08L 9/10
See application file for complete search history.

(56) References Cited

U.S. PATENT DOCUMENTS

| | | |
|---|---|---|
| 6,075,084 A | 6/2000 | Mabry et al. |
| 8,586,651 B2 | 11/2013 | Wang et al. |
| 2001/0036995 A1 | 11/2001 | Mahmud et al. |
| 2002/0016404 A1 | 2/2002 | Mabry et al. |
| 2016/0289398 A1 | 10/2016 | Tanaka et al. |

FOREIGN PATENT DOCUMENTS

| | | |
|---|---|---|
| EP | 2 497 798 A1 | 9/2012 |
| JP | 2006/169292 A | 6/2006 |
| JP | 2007/269863 A | 10/2007 |
| WO | WO 2014/189826 | 11/2014 |
| WO | WO 2017/110944 A1 | 6/2017 |

OTHER PUBLICATIONS

The International Search Report and The Written Opinion of the International Searching Authority, or the Declaration of International Application No. PCT/US2018/059762, dated Mar. 20, 2019.

*Primary Examiner* — Edward J Cain

(57) ABSTRACT

Methods to prepare elastomer compounds are described that include dry mixing at least one additive to an elastomer composite masterbatch at low temperatures over a shortened mixing cycle with reduced energy consumption. The elastomer composite masterbatch is produced in a liquid masterbatch process. The resulting elastomer compounds are further described as well as property improvements that can be achieved.

16 Claims, 2 Drawing Sheets

METHODS OF PRODUCING AN ELASTOMER COMPOUND AND ELASTOMER COMPOUNDS

The present invention relates to methods to make or prepare elastomer compounds from elastomer composite masterbatches.

Numerous products of commercial significance are formed of elastomeric compositions wherein particulate filler is dispersed in any of various synthetic elastomers, natural rubber or elastomer blends. Carbon black (abbreviated herein as CB), for example, is widely used as a reinforcing agent in natural rubber and other elastomers. It is common to produce a masterbatch, that is, a premixture of filler, elastomer and various optional additives, such as extender oil, and then in some cases to blend such masterbatch with additional elastomer in a subsequent mixing step.

Carbon black masterbatch is prepared with different grades of commercially available carbon black which vary both in surface area per unit weight and in structure, which describes the size and complexity of aggregates of carbon black formed by the fusion of primary carbon black particles to one another. Numerous products of commercial significance are formed of such elastomeric compositions of carbon black particulate filler dispersed in rubber. Such products include, for example, vehicle tires wherein different elastomeric compositions may be used for the tread portion, sidewalls, wire skim and carcass. Other products include, for instance, engine mount bushings, weather stripping, hoses, windshield wipers and other automotive components; off-road vehicle track elements; aerospace components comprising rubber compounds; bushings, gaskets and anti-vibration components for vehicles, buildings, marine installations, ships and aircraft; seals, gaskets, hoses, belts, liners, pads, wheels, conveyor belts and other industrial systems, e.g., for transporting mineral ores during processing, and the like.

Good dispersion of carbon black in rubber compounds has been recognized for some time as one of the most important objectives for achieving good quality and consistent product performance, and considerable effort has been devoted to the development of procedures for assessing dispersion quality in rubber. The mixing operations have a direct impact on mixing efficiency and on macro-dispersion. In general, better carbon black macro-dispersion is achieved in a dry-mixed masterbatch by longer mixing and by more intensive mixing. Unfortunately, however, achieving better macro-dispersion by longer, more intensive mixing degrades the elastomer into which the carbon black is being dispersed. This is especially problematic in the case of natural rubber, which is highly susceptible to mechanical/thermal degradation, and in the case of higher surface area CBs, particularly those having a relatively low structure. Longer and more intensive mixing, using known mixing techniques and apparatus, such as an internal mixer, reduces the molecular weight of the natural rubber masterbatch-composition. Thus, improved macro-dispersion of carbon black in natural rubber is known to be achieved with a corresponding, generally undesirable reduction in the molecular weight of the rubber.

In addition to dry mixing techniques, it is known to continuously feed latex and a carbon black slurry to an agitated coagulation tank. Such "wet" techniques are often used with synthetic elastomer, such as styrene butadiene rubber (SBR). The coagulation tank contains a coagulant such as salt or an aqueous acid solution typically having a pH of about 2.5 to 4. The latex and carbon black slurry are mixed and coagulated in the coagulation tank into small beads (typically a few millimeters in diameter) referred to as wet crumb. The crumb and acid effluent are separated, typically by means of a vibrating shaker screen or the like. The crumb is then dumped into a second agitated tank where it is washed to achieve a neutral or near neutral pH. Thereafter the crumb is subjected to additional vibrating screen and drying steps and the like. Variations on this method have been suggested for the coagulation of natural and synthetic elastomers, for example, in commonly owned U.S. Pat. No. 4,029,633 to Hagopian and in U.S. Pat. No. 3,048,559 to Heller. Additional wet masterbatch methods are described in, e.g., U.S. Pat. No. 6,841,606, PCT Publication WO 2006/068078, and PCT Publication WO 2006/080852. As used herein, "wet mixing" or "wet masterbatch" techniques refer to methods in which elastomer latex or synthetic rubber solution is combined in a liquid form with particulate filler slurry fluid to produce elastomer composite. The resulting elastomer composite is termed a wet mix composite or wet masterbatch. In contrast, dry mix composites are prepared by dry mixing methods in which dry particulate filler is combined with dry rubber.

An alternative mixing method is disclosed by commonly owned U.S. Pat. Nos. 6,048,923 and 6,929,783, which disclose a wet masterbatch process in which separate streams of a carbon black slurry and an elastomer latex are combined under conditions where the elastomer latex coagulates without the use of added coagulants. The masterbatch is dewatered to about 15% to 25% water content and then passed through a continuous compounder and, optionally, an open mill. An additional method of dewatering and drying a wet masterbatch to optimize the microdispersion of the resulting elastomer composite is described in US Patent Application Publication No. US 2011/0021664.

Mastication of dry masterbatch (e.g., after it is produced by a dry mix process or by a wet masterbatch process, followed by drying) may be employed to adjust Mooney viscosity and improve processability while incorporating additives such as oils, antioxidants, and zinc oxide. Vulcanizing agents (curing agents) may be added as well or may be added in a second mastication step. However, the mixing step done with vulcanizing agents present may need to be done at lower temperatures (e.g., below 120° C.) to prevent precure. In addition, overmixing may be detrimental to viscoelastic properties and may increase flocculation during storage, which can increase storage hardening and further degrade rubber performance (Wang, et al., KGK Kautschuk Gummi Kunststoffe, Vol. 7-8, 2002, pp. 388-396). Thus, it is desirable to have methods for combining vulcanizing agents with elastomer composites produced by a wet masterbatch method that do not compromise the mechanical properties of the resulting vulcanizate.

For some applications, it is desirable to employ blends of elastomers to optimize the mechanical properties of the masterbatch and/or a vulcanized rubber product of the masterbatch. Blends may be produced by co-coagulating a mixture of elastomer lattices (see, e.g., U.S. Pat. No. 4,271,213) or by recovering a polymer blend from a mixture of an elastomer latex and a solution containing a second polymer (see, e.g., U.S. Pat. No. 5,753,742). Alternatively, blends of elastomers may be produced by dry-mixing two elastomers together. It is known to blend dry mixed elastomer composites with additional elastomer to reduce hysteresis.

U.S. Pat. No. 7,105,595 B2, to Mabry et al., incorporated herein by reference in its entirety, describes elastomer composite blends prepared by wet/dry mixing methods and apparatus. In the wet mixing step, for instance, elastomer composite is prepared by the wet masterbatch method disclosed in U.S. Pat. No. 6,048,923. The coagulum produced by such wet mixing step, with or without intermediate processing steps, is then mixed with additional elastomer in a dry mixing step, for example, during compounding to form elastomer composite blends. The additional elastomer combined with the coagulum may be the same as or different from the elastomer(s) used in the wet mixing step.

Dry mixing (compounding) of elastomer composite masterbatches produced by wet masterbatch techniques introduces all the risks to material properties that were originally averted by wet mixing of the elastomer composite masterbatch; however, dry mixing of one or more additives with a masterbatch is beneficial for a whole host of reasons including but not limited to, introducing additional elastomer(s), filler(s), antioxidant(s), oils, curing agent(s) and the like. Generally, this dry mixing stage is done in two stage mixing or one stage mixing. The common belief generally held in the rubber industry is that this dry mixing of additional additives into the elastomer composite to form an elastomer compound needs to be done at temperatures of at least 130 deg C. and for a sufficient duration to generate a good dispersion of the filler in the elastomer composite or elastomer compound, to generate good chemical interaction with the elastomer and filler, and/or to generate bound rubber. This common belief was held for elastomer composite masterbatches formed by dry or wet masterbatch methods. However, for wet masterbatches, this subsequent dry mixing of an additive(s) at temperatures of at least 130 deg C. can be unnecessary and/or detrimental to product performance as such temperatures can degrade rubber compound properties and/or product performance. The present invention addresses this problem with an efficient method of dry mixing of additives into elastomer composites formed by wet masterbatch methods.

SUMMARY OF THE INVENTION

This invention addresses the problem(s) described above in view of the discovery that high temperatures, such as 130 deg C. or higher, should be avoided during dry mixing of the elastomer composite masterbatch with one or more additives to form an elastomer compound. Using temperatures of under 130 deg C. during the dry mixing step or process can avoid degradation of one or more properties of the elastomer compound and/or preferably, enhances one or more of these properties, while unexpectedly allowing the use of shorter mixing cycles and lower energy consumption to achieve equivalent, or superior, elastomer compound and rubber article properties.

Accordingly, the present invention relates to a method of producing an elastomer compound, wherein the method includes preparing an elastomer composite masterbatch from a wet masterbatch method (e.g., from an elastomer latex and particulate filler slurry), and then dry mixing (in one stage mixing or in two or more stage mixing) the elastomer composite masterbatch with at least one additive to obtain an elastomer compound such that during the dry mixing, the process temperature for one stage mixing is maintained at a process temperature of less than 130 deg C., and for two stage mixing, is maintained at a process temperature of less than 130 deg C. in stage one of the two stage mixing and does not exceed 120 deg C. in stage two of the two stage mixing when at least one curative is used in stage two. If no curative is used in stage two, then stage two of two stage mixing can optionally be maintained at a temperature of less than 130 deg C.

The present invention further relates to elastomer compounds and to vulcanized elastomer compounds made from the processes of the present invention.

Also, the present invention relates to articles incorporating or made from the elastomer compounds of the present invention, including, but not limited to, vehicle tire treads, sidewalls, wire skim and carcass; off-road vehicle track elements; engine mount bushings, conveyor belts, windshield wipers and other automotive components comprising rubber compounds; aerospace components comprising rubber compounds, anti-vibration components for vehicles, buildings, marine installations and aircraft; seals, gaskets, hoses, belts, liners, pads, wheels, and conveyors for transporting mineral ores and the like.

Advantageously, in some of the implementations disclosed here, product attributes such as the mechanical reinforcement and/or hysteresis properties of the elastomer compound, are maintained or improved with the methods of the present invention, relative to industry standards, while the methods of the present invention unexpectedly conserve process time and energy.

In the alternative, or in addition, the reinforcement properties, such as the ratio of the tensile moduli at 300% and 100% strain, are maintained or improved with respect to the elastomer compounds made according to the present invention.

Certain elastomer compounds of the present invention may have superior properties such as, for example, with respect to hysteresis and/or reinforcement, when compared to elastomer compounds produced by the same wet masterbatch technique but with dry mixing of the additive such that the process temperature is at least 130 deg C. during the initial, non-productive, dry mixing stage.

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous implementations without departing from the scope of the invention.

BRIEF DESCRIPTION OF THE DRAWINGS

FIG. 1 is a graph showing a comparison of properties namely Max Tan delta at 60 deg C. vs. M300/M100 modulus data. FIG. 2 is a graph showing Max Tan delta at 60 deg C. properties based on the process temperature used in the first stage of dry mixing. FIG. 3 is a graph showing M300/M100 properties based on the process temperature used in the first stage of dry mixing.

DETAILED DESCRIPTION OF THE PREFERRED EMBODIMENTS

Figure 1:
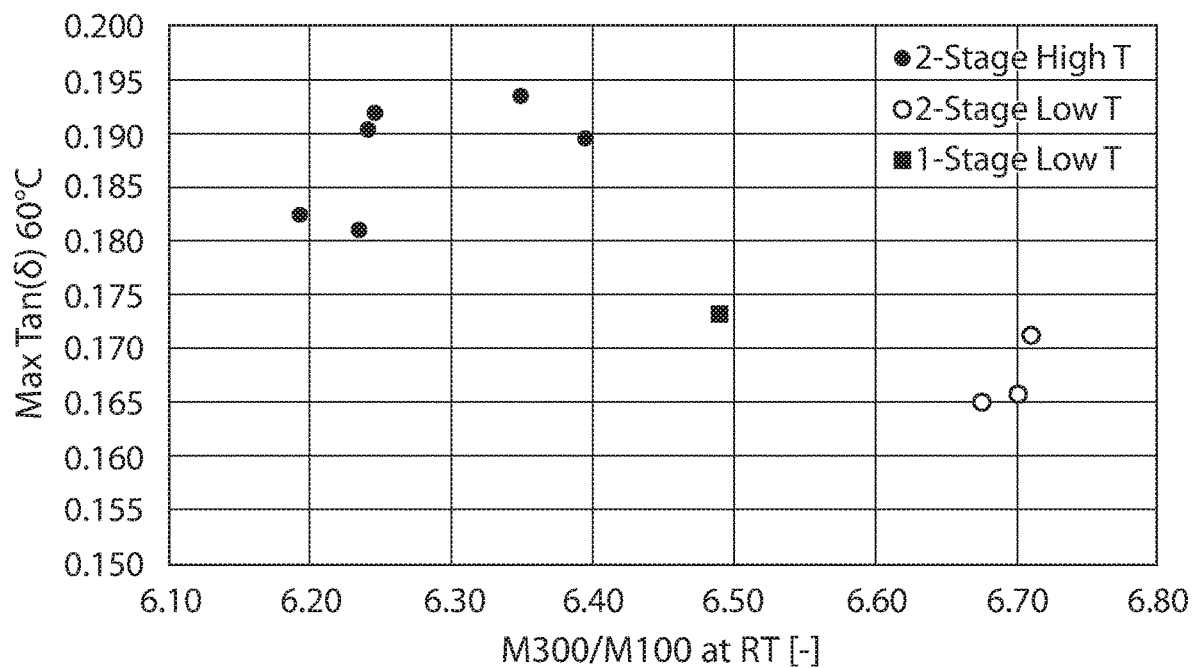
FIGS. 1-3 are graphs depicting results achieved for low temperature dry mixing (the present invention) and high temperature dry mixing (comparative) as set forth in Example 1.
Figure 2:
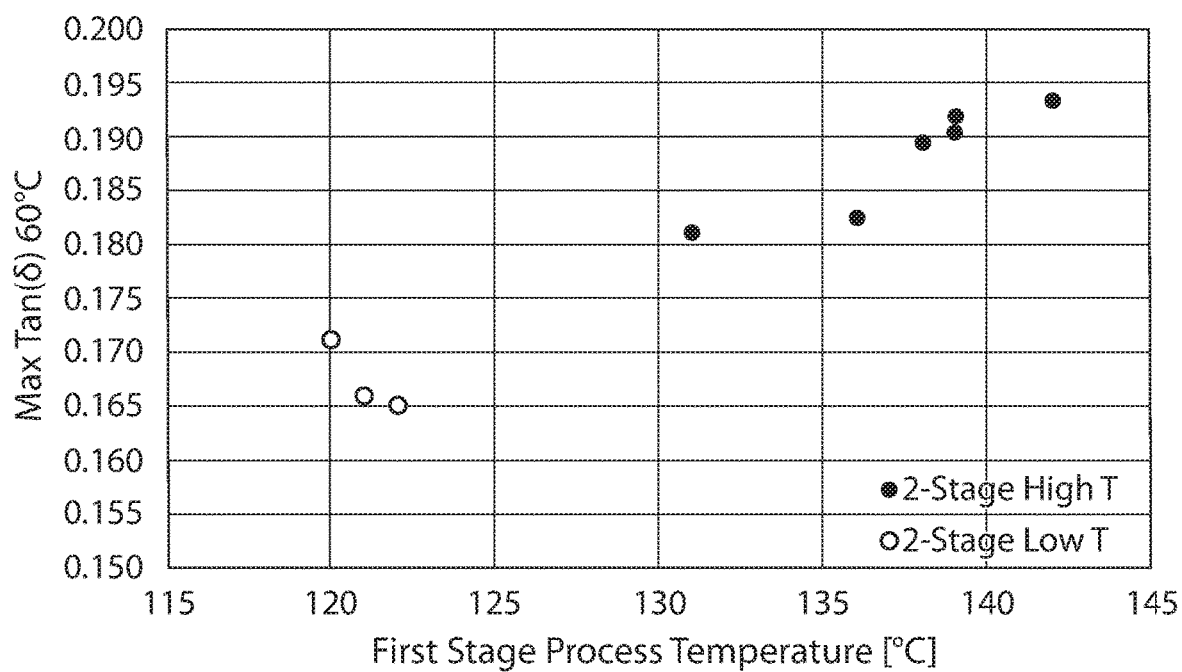
Figure 3:
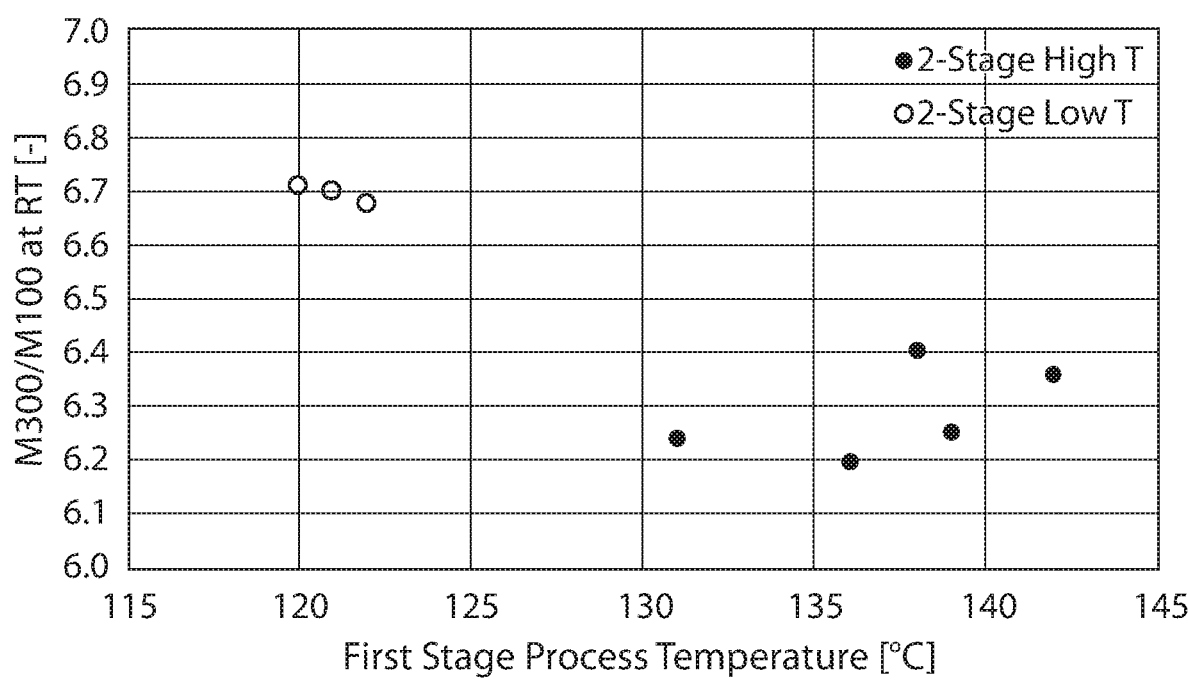

The present invention generally relates to methods to produce elastomer compounds and to the resulting elastomer compounds.

In the methods of the present invention to produce an elastomer compound, in general, the methods comprise, consists essentially of, consists of, or include preparing or providing an elastomer composite masterbatch and then dry mixing (in one stage or two or more stages) the elastomer composite masterbatch with at least one additive to obtain an elastomer compound such that during the dry mixing, the process temperature for one stage mixing is at a temperature less than 130 deg C., and for two stage mixing, is below 130 deg C. in stage one of the two stage mixing and does not exceed 120 deg C. in stage 2 of the two stage mixing when at least one curative is included in stage 2. If no curative is used in stage 2 (i.e., a non-productive mixing step), then the stage 2 of the two-stage mixing optionally can be less than 130 deg C. If the dry mixing is done in more than two stages, such as three stage dry mixing, then generally, for any stage of dry mixing before the last stage, the process temperature of the dry mixing is less than 130 deg C. and the process temperature of the dry mixing of the last (productive) stage generally does not exceed 120 deg C. If no curative is used in the last stage, then all stages of the multi stage mixing optionally can be maintained at a temperature less than 130 deg C. When two or more stages of dry mixing are used, the addition of at least one additive need only occur in at least one of the stages. Thus, when two or more stages are used, one of the dry mixing stages can be a dry mixing of the elastomer composite masterbatch or the material obtained from a previous dry mixing stage with no additive added. In the alternative, when two or more stages of dry mixing are used, two or more stages of the dry mixing can have an additive added during each dry mixing stage, where the additive can be the same or different from a previous stage of dry mixing. For purposes of the present invention, dry mixing stages or steps are carried out at a temperature of less than 130 deg C., and if at least one dry mixing stage reaches a process temperature of 130 deg C., then it is considered high temperature dry mixing and not part of the present invention.

In more detail, and as used herein, the elastomer composite masterbatch is a masterbatch obtained by "wet mixing" or "wet masterbatch" or "liquid masterbatch" techniques. The elastomer composite masterbatch refers to masterbatches formed from methods in which elastomer latex or synthetic rubber solution is combined in a liquid form with particulate filler slurry fluid to produce elastomer composite, and other processes employing liquid or solvent to more readily disperse reinforcing materials into an elastomer-containing fluid to form an elastomer composite masterbatch. The resulting elastomer composite can be termed a wet mix composite or wet masterbatch. In contrast, "dry mix" masterbatches or composites are prepared by dry mixing methods in which dry particulate filler is combined with dry rubber, or a dry masterbatch of elastomer and filler is combined with additional elastomer and/or filler, and/or a second dry masterbatch to make a compound.

The elastomer composite masterbatch used in the methods of the present invention can be characterized further as having sufficient bound rubber present prior to any dry mixing or processing. Bound rubber formation generally refers to the adsorption of polymer chains on the filler surface (e.g., the adsorption of polymer chains of an elastomer latex on carbon black or other particulate filler). When sufficient bound rubber is present in a reinforced elastomeric composite material, such materials are characterized by favorable Mooney viscosity values (e.g., a target Mooney value of about 70 to 80 (ML 1+4@100° C.) for materials comprising about 50 phr filler; with acceptable values from about 65 to 90, depending upon the material formulation). Such Mooney values correlate to benefits including insignificant filler flocculation, minor storage hardening, and good processability of masterbatches in downstream manufacturing operations. Thus, the amount of energy applied to work such materials during production of the elastomer composite masterbatch is selected to create bound rubber and yield materials having such favorable Mooney values in an uncured state.

The elastomer composite masterbatch (prior to the dry mixing step) used in the methods of the present invention can, in addition or alternatively, be characterized further as having a percentage of undispersed areas of filler of 10% or lower, such as 7% or lower, or 5% or lower, or 3% or lower, or 2% or lower, or 1% or lower, or 0.5% or lower, such as from about 0% to 10%, 0.001% to 10%, 0.01% to 10%, or 0.01% to 5%; or greater than or equal to 1% and less than 10%, or greater than or equal to 1% and less than 8%. This can be measured by an optical microscopy method of quantifying filler macrodispersion in elastomer, such as the method and equation described at column 3 of U.S. Pat. No. 6,048,923B1, to quantify undispersed carbon black filler particles of at least 10 micrometers in a largest dimension, or by alternative optical image methods of quantifying undispersed filler in rubber, such as the method for measuring dispersed areas of filler (i.e., Z value dispersion; expressed as the percent area of dispersed filler), as disclosed in Otto, et al, *New Reference Value for the Description of Filler Dispersion with the Dispergrader* 1000 NT, KGK Kautschuk Gummi Kunstoffe 58. Jahrgang, Nr. 7-8/ 2005; or in the ISO 11345, second edition, 2006-02-01, Method of Assessing Dispersion.

The elastomer compound of the present invention, as used herein, is an elastomer compound that is the result of compounding via dry mixing of an elastomer composite masterbatch obtained by "wet mixing" or "wet masterbatch" or "liquid masterbatch" techniques with at least one additive (e.g., an elastomer(s), filler(s) and/or other additives).

Further details, including optional details of the elastomer composite masterbatch and the resulting compound are provided herein.

Regarding the dry mixing, this can be one or multiple stages or steps. As indicated, the dry mixing of the elastomer composite masterbatch and the at least one additive occurs in a manner such that the process temperature during the dry mixing of the elastomer composite masterbatch is maintained below 130 deg C. when no curative(s) is used or present. When a curative is used in a productive mixing stage, then the process temperature generally does not exceed a process temperature of 120 deg C. during that dry mixing stage or any subsequent dry mixing stage. The process temperature is a reference to an instrument temperature reading provided by the rubber mixing equipment. Generally the target maximum process temperature is referred to as a "dump temperature". The instrument temperature reading is generally based on thermocouple installed in the wall of the mixing chamber that continuously records temperature at the wall of the mixing chamber. Thus, the process temperature as used herein, is a reference to this instrument temperature reading at the instrument maximum dump temperature. The temperature can be measured by using a thermocouple or thermistor, resistance thermometer (RTD), a pyrometer, or any other temperature reading devices used in industry which tend to be a fixture on a rubber mixer. The process temperature during the dry mixing of the invention is maintained below 130 deg C. More specific process temperature ranges and combination of process temperature ranges with the number of stages can be as follows:

A: For One-stage dry mixing of the elastomer composite masterbatch with at least one additive and with the proviso that the additive is not a curative or curing agent: a process temperature below 130 deg C., or not exceeding 120 deg C., such as remaining in a process temperature range of about 80 deg C. to 129 deg C., or about 90 deg C. to 129 deg C., or 100 deg C. to 125 deg C., or 90 deg C. to 127 deg C., or 80 deg C. to 120 deg C., or 90 deg C. to 120 deg C., or 100 deg C. to about 120 deg C.

B: For One-stage dry mixing of the elastomer composite masterbatch with at least one additive where at least one of the additives is a curative or curing agent: a process temperature not exceeding 120 deg C., or not exceeding 115 deg C., such as remaining in a process temperature range of about 80 deg C. to 120 deg C., or about 90 deg C. to 120 deg C., or 80 deg C. to 120 deg C., or 90 deg C. to 115 deg C., or 100 deg C. to about 115 deg C., or 80 deg C. to 110 deg C.

C: For Two-stage dry mixing of the elastomer composite masterbatch with at least one additive in one or both of the stages (with the additive being the same or different per stage if used) and with the proviso that the additive is not a curative or curing agent in any of the stages. Stage 1 of the dry mixing: a process temperature is below 130 deg C., or not exceeding 125 deg C., or not exceeding 120 deg C., such as remaining in a process temperature range of about 80 deg C. to 129 deg C., or about 80 deg C. to 125 deg C., or about 90 deg C. to 129 deg C., or 80 deg C. to 120 deg C., or 90 deg C. to 120 deg C., or 100 deg C. to about 120 deg C.; and, Stage 2 of the dry mixing: a process temperature is below 130 deg C., or not exceeding 120 deg C., such as remaining in a process temperature range of about 80 deg C. to 129 deg C., or about 90 deg C. to 129 deg C., or 125 deg C., or 80 deg C. to 120 deg C., or 90 deg C. to 120 deg C., or 100 deg C. to about 120 deg C.

D: For Two-stage dry mixing of the elastomer composite masterbatch with at least one additive in one or both of the stages (with the additive being the same or different per stage if used) and where additive is used in Stage 2 and one of the additives in Stage 2 includes or is a curative or curing agent, and Stage 1 does not include a curative or curing agent. Then, Stage 1 of the dry mixing: a process temperature is below 130 deg C., or not exceeding 125 deg C., or not exceeding 120 deg C., such as remaining in a process temperature range of about 80 deg C. to 129 deg C., or about 80 deg C. to 125 deg C., or about 90 deg C. to 129 deg C., or 80 deg C. to 120 deg C., or 90 deg C. to 120 deg C., or 100 deg C. to about 120 deg C.; and, Stage 2 of the dry mixing: a process temperature not exceeding 120 deg C., or not exceeding 115 deg C., such as remaining in a process temperature range of about 80 deg C. to 120 deg C., or about 90 deg C. to 120 deg C., or 80 deg C. to 120 deg C., or 90 deg C. to 115 deg C., or 100 deg C. to about 115 deg C., or 80 deg C. to 110 deg C.

E: For Multi-stage dry mixing (3 or more dry mixing stages) of the elastomer composite masterbatch with at least one additive in one of the stages (with the additive being the same or different per stage if used in 2 or more stages) and where one of the additives in last Stage includes or is a curative or curing agent, and previous Stages do not include a curative or curing agent. Then, any Stage prior to the last Stage of the dry mixing (the production stage): a process temperature is below 130 deg C., or not exceeding 120 deg C., such as remaining in a process temperature range of about 80 deg C. to 129 deg C., or about 90 deg C. to 129 deg C., or 80 deg C. to 125 deg C., or 90 deg C. to 125 deg C., or 80 deg C. to 120 deg C., or 90 deg C. to 120 deg C., or 100 deg C. to about 120 deg C.; and, the last Stage of the dry mixing: a process temperature not exceeding 120 deg C., or not exceeding 115 deg C., such as remaining in a process temperature range of about 80 deg C. to 120 deg C., or about 90 deg C. to 120 deg C., or 80 deg C. to 120 deg C., or 90 deg C. to 115 deg C., or 100 deg C. to about 115 deg C., or 80 deg C. to 110 deg C.

The curative or curing agent, for instance, can be sulfur and/or an accelerator.

To achieve the dry mixing, any commercially available dry mixer or dry mixing technique can be used. Suitable rubber mixing equipment includes closed or internal mixers or extruders equipped with intermeshing or tangential rotors and open mixers such as roll mills, and operation of the equipment and the process may be done in batch mode, continuous mode or semi-continuous mode. For example, the mixer used for dry mixing can be of any tangential or intermeshing design or a combination thereof, a continuous mixer, an internal mixer, a twinscrew extruder, a single screw extruder, or a roll mill. Suitable devices are well known and commercially available, including for example, a Unimix Continuous Mixer and MVX (Mixing, Venting, eXtruding) Machine from Farrel Corporation of Ansonia, Conn., a long continuous mixer from Pomini, Inc., a Pomini Continuous Mixer, twin rotor corotating intermeshing extruders, twin rotor counterrotating non-intermeshing extruders, Banbury mixers, Brabender mixers, intermeshing-type internal mixers, kneading-type internal mixers, continuous compounding extruders, the biaxial milling extruder produced by Kobe Steel, Ltd., and a Kobe Continuous Mixer.

The temperature of the elastomer composite masterbatch during the dry mixing with at least one additive can be controlled, so that the elastomer composite masterbatch does not reach the process temperature of 130 deg C. (or other higher process temperature) during the dry mixing, by setting or adjusting one or more of the following parameters: the rpm or mixing speed of the mixer used, the mixing time, using a cooling jacket on the mixer or part thereof, using heat sinks or other heat withdrawal devices, adjusting the volume of the elastomer composite masterbatch being mixed, or any combination of these parameters. For instance, a lower rpm (or the lowering of the rpm) of the mixer or mixer paddle or rotor(s) results in lower temperatures of the composite. Using shorter mixing times or using staggered mixing (e.g., mix, stop, mix, stop, etc.) will control temperature. As an option, a temperature probe or other temperature monitoring device can be connected to a control box such that one or more the parameters mentioned here can be controlled to avoid exceeding the desired maximum temperature. For instance, such a control box can be set up such that the rpms of the mixer are reduced upon reaching a maximum temperature or a temperature near the maximum temperature.

For purposes of the dry mixing step(s), the additive(s) can be added to the elastomer composite masterbatch in the mixer, or the elastomer composite masterbatch can be added to the additive in the mixer, or both the additive and elastomer composite masterbatch can be added to the mixer at the same time or about the same time. Any sequence or order can be used and is not critical to achieving the benefit(s) of the present invention. The mixing or mixer can be started with the elastomer composite masterbatch alone and/or the additive, and then the other component added afterwards.

Regarding types of additives, one or more additives can be used. If two or more additives are used, the additives can be added at the same time, or in sequence or in any order during the dry mixing. More than one mixing stage (and/or mixing device or technique) can be used to add different additives. Additives used with elastomer composites are well known to those skilled in the art and include, for example, one or more of: fillers (e.g. carbon black, silica, dual phase carbon-silica fillers, silica-coated carbon black, metal oxides), elastomers, antioxidants, antiozonants, plasticizers, processing aids (e.g., liquid polymers, oils and the like), resins, flame-retardants, extender oils, lubricants, curing agents, or any combination of any of them. Exemplary additives include but are not limited to natural rubber, butadiene rubber, synthetic rubber, additional filler, zinc oxide, or stearic acid, or any combinations thereof. The amounts of the additives used vary depending upon which type of additive is used. For instance, if the additive is a filler, the amount can be from about 1 phr to about 65 phr or more. If the additive is an elastomer, the amount can be from about 5 phr to about 80 phr or more. If the additive is an antioxidant, antiozonant, plasticizer, processing aid (e.g., liquid polymers, oils and the like), resin, flame-retardant, extender oil, lubricant, additional filler, and/or curing agent, the individual amounts can be from about 0.1 phr to about 5 phr or combined amounts can be from about 0.1 phr to about 20 phr or more, such as from about 0.1 phr to about 30 phr (with phr be a reference to the elastomer masterbatch composite). If the at least one additive added for dry mixing is additional filler(s), the additional filler (e.g., a second filler, or a mixture of fillers) can be the same as or different from the first filler present in the elastomer composite masterbatch.

If the at least one additive added for dry mixing is an elastomer(s), the additional elastomer (e.g., second elastomer) can be the same or different from the elastomer (e.g., the first elastomer) present in the elastomer composite masterbatch. As used herein, the "first elastomer" or "second/additional elastomer material" can each be a single elastomer or a mixture of elastomers. The second elastomer material may include additional ingredients, such as filler or antioxidant or other additives. For purposes of the present invention, the elastomer composite masterbatch in which particulate filler is disposed in the first elastomer can be termed "neat elastomer composite masterbatch." The mixture of the neat elastomer composite masterbatch with the optional second elastomer material can be termed "elastomer composite blend" during processing or "elastomer compound" in final form.

As a specific example and as an option, a process for producing an elastomer compound of the present invention can include preparing an elastomer composite masterbatch comprising natural rubber and a first filler loading of carbonaceous aggregated filler (e.g., a semi-reinforcing, or a reinforcing carbon black having an STSA of at least 25 m2/g, or at least 90 m$^2$/g, or at least 120 m2/g), with the option of the first filler loading being at least about 20 phr, or from about 20 phr to about 150 phr, by a wet masterbatch method; and blending or compounding by dry mixing, the elastomer composite masterbatch with a second elastomer composite material comprising an elastomer and optional particulate filler to produce an elastomer compound having an optional second filler loading, the second filler loading being at least about 5 phr.

As an option, the elastomer compound of the present invention can have a M300/M100 of the vulcanized elastomer compound that is at least 0.09, or at least 0.2 or at least 0.5 higher than the M300/M100 for a vulcanized elastomer compound of the same composition but prepared where the dry mixing step (or one of the dry mixing steps) occurred at a temperature at or above 130 deg C., such as 140 deg C. or 150 deg C.

The elastomer compounds of the present invention can be curative-free compositions, curative-bearing compositions, or vulcanized rubber materials and products formed of such compositions. Mechanical properties are measured on vulcanized compositions; thus, following formation of the wet masterbatch and dry mixing with at least one additive, the resulting elastomer compound is vulcanized to measure tensile and hysteresis properties.

In certain implementations, the present invention relates to elastomer compound where the elastomer composite masterbatch and/or the elastomer compound contains particulate filler, for example, carbon black, in an amount of at least about 10 phr, such as, for instance, from about 30 phr to about 75 phr, from about 35 phr to about 60 phr, from about 40 phr to about 80 phr. One of skill in the art will recognize that the desired carbon black loading will depend on the surface area and structure of the carbon black. For example, the desired loading for a carbon black having a surface area, as measured by STSA, greater than 120 m$^2$/g may be much less than the desired loading for a carbon black having a much lower surface area such as an N774 type (STSA=29 m$^2$/g) carbon black in some composites, while the opposite may be desired in other composites. The present invention enhances the dispersion and use of carbon blacks having a higher surface area, such as N100 and N200 grades of reinforcing carbon blacks, that tend to be difficult to disperse in elastomers using standard industry mixing processes, and enables or enhances dispersion and use of carbon blacks having high surface area in combination with relatively low structure, e.g., carbon blacks with an STSA surface area in the range of 110 to 230 m2/g and a COAN structure in the range of 55 to 95 ml/100 g.

In certain implementations, the present invention relates to elastomer compound, and an elastomer compounding process, wherein a first elastomer composite masterbatch made by a liquid masterbatch process is compounded, in a dry mixing process, with a second elastomer masterbatch additive, or with multiple masterbatch additives, at a temperature of less than 130 deg C. The second elastomer masterbatch additive may be a masterbatch made by a liquid masterbatch process, or it may be a masterbatch made by a dry masterbatch process. The second elastomer masterbatch additive may comprise the same, or different filler(s), and the same or different elastomer(s) as those employed in the first elastomer composite masterbatch. For example, the first elastomer composite masterbatch may comprise natural rubber and carbon black, while the second masterbatch additive may comprise butadiene rubber and carbon black, or butadiene rubber and silica, or natural rubber and silica, and/or silica and carbon black, made by a liquid masterbatch process, or combinations thereof. The second masterbatch additive may comprise natural rubber (NR), styrene-butadiene rubber (SBR), butadiene rubber (BR), or isoprene rubber (IR), or modifications or combinations thereof, in any combination of filler, smalls and elastomer, and may be made in any dry or liquid masterbatch process. Any combination of two masterbatches, one of which is made by a liquid masterbatch process, may be blended together in the compounding process of the invention to achieve a desired final compound. For example, a compound made of two or more masterbatches may contain 20 to 75 phr filler, or 30 to 60 phr filler, or 30 to 50 phr filler, or 10 to 60 phr filler, or 10 to 40 phr filler, and a ratio of two or more elastomers, e.g., NR:BR or NR:SBR, or NR:BR+SBR, or NR:IR, or BR:NR, or SBR:NR, or IR:NR, or other elastomer combinations, of 50:50, or 40:60, or 30:70, or 20:80, or 10:90, or 5:95, or any ratio within these ranges.

Whether compounding "neat" elastomer composite masterbatch with curatives, antioxidants and/or other small volume ("smalls") additives, or if using a larger quantity of additive, such as an additional elastomer, or a second reinforcing filler, or both, or a second masterbatch additive, in the reduced temperature compounding process of the invention, blending the elastomer composite masterbatch with such additives can be carried out by mixing at reduced times and reduced energy input, and/or with minimal pre-mastication of the neat elastomer composite masterbatch. By keeping non-productive, compound mixing stage temperatures below 130 deg C., stage one mixing time may be reduced significantly, e.g., by 10-60%, or 10-50%, or 15-40%, or 10-30%, or 15-20%, and applied energy may be reduced, e.g., by 10-50%, or 10-30%, or 10-40%, or 15-40%, while achieving at least equivalent, and in some cases, improved, mechanical and dynamic properties in the mixed compound that comprises the elastomer composite masterbatch obtained by a liquid masterbatch process. In one implementation, one-stage mixing is selected to incorporate all the ingredients of the curative package, including the curatives themselves, in a single mixing step. This may be followed by limited amounts of mastication of the compound, e.g., by roll milling or extrusion.

Certain implementations of the elastomer masterbatch, blends and compounds, methods and apparatus for producing them are disclosed below. While various preferred implementations of the invention can employ a variety of different fillers and elastomers, certain portions of the following detailed description of method and apparatus aspects of the invention will, in some instances, for convenience, describe elastomer composites comprising natural rubber and carbon black and/or silica. It will be within the ability of those skilled in the art, given the benefit of this disclosure, to employ the method and apparatus disclosed here in accordance with the principles of operation discussed here to produce neat elastomer composites and elastomer composite blends comprising a number of alternative or additional elastomers, fillers and other materials.

As indicated, the elastomer composite masterbatch is prepared by a wet masterbatch method (e.g., from an elastomer containing fluid, such as a latex or a solution polymer, and particulate filler slurry).

Examples of wet masterbatch processes that can be used herein, include those disclosed in U.S. Pat. Nos. 6,048,923; 6,929,783 and 8,586,651, the contents of which are incorporated by reference herein, and described below. In such processes carbon black or other filler is mixed with aqueous fluid to form a slurry having a concentration of 10-25 wt % filler and the slurry is fed to a mixing zone of a coagulum reactor under pressure such that the slurry is introduced as a jet into the mixing zone at a rate adjusted to achieve final filler loading levels in an elastomer and achieve the desired production rate. Natural rubber latex having a dry rubber content of about 20-35% is fed into the mixing zone. The latex flow rate is adjusted to achieve final filler loading levels. The filler slurry and latex are mixed by entraining the latex into the filler slurry in the mixing zone of the coagulum reactor. During the entrainment process, the filler is intimately mixed into the latex and the mixture coagulated as it exits the mixing zone in a continuous or semi-continuous process. A masterbatch crumb or continuous coagulum is discharged from the coagulum reactor and dewatered to about 10-20 wt % moisture with a dewatering extruder. The dewatered coagulum is fed into a continuous compounder and masticated to achieve a moisture content below 5 wt %, followed by further mastication, cooling and drying on an open roll mill, further cooling, cutting into small strips compressed together to form a "loose" product bale and packaging. Further examples of wet masterbatch processes that can be used herein include those disclosed in, e.g., U.S. Pat. Nos. 5,763,388, 6,841,606, 6,646,028, 7,101,922, 3,335,200, and 3,403,121, and publications US2009/062428, WO2011/034589, WO2011/034587 and U.S. Patent Publication No. 2011/00221664, WO2012/037244 and WO2017/011548 (the contents of which are incorporated herein by reference) and other wet masterbatch processes known to those of skill in the art. In general, an elastomer containing fluid and a particulate slurry fluid are combined, and the elastomer containing fluid is caused to coagulate to form a masterbatch crumb. The masterbatch crumb may be dewatered to form a dewatered coagulum, and further worked to form a dry elastomer composite masterbatch with rubber properties suitable for further processing into compounds and finished rubber articles. In certain instances, additives such as curatives, antioxidants and other "smalls" may be added at a controlled temperature of below 120 deg C. in a continuous or semi-continuous manner to an in-process elastomer composite masterbatch after such intermediate material has been dewatered, and during or after drying, but before packaging, e.g., additives may be blended into such intermediate material at a roll mill and/or with a low speed extruder or mixer located downstream from a dewatering operation. As a consequence of such additions to the intermediate materials, storage hardening of uncured elastomer composite masterbatch may be minimized, and subsequent compound mixing of the masterbatch with filler additive and/or elastomer or masterbatch additive to make a final compound may be carried out at a temperature less than 130 deg C. in one stage, or in a reduced number of stages relative to industry standards, in less mixing time and with lower energy input. In this manner more uniform dispersion of such additives in the final compound, a more efficient compounding process, and improved product qualities can be realized. Such introduction of additives to intermediate materials is particularly useful in the liquid masterbatch processes disclosed in U.S. Pat. Nos. 6,048,923; 6,929,783 and 8,586,651.

Examples of other wet masterbatch processed products that may benefit from this invention include those mentioned in WO 2017/103519A1, WO 2017/103518A1, WO2017/103495A1, WO2017/021219A1, WO2016/106408A1, WO2016/166483A1, WO2016/180693A1, WO2012/080109A1, WO2012/080111A1, WO2013/060857A1, WO2013/087657A1, U.S. Pat. Nos. 9,611,380, 9,670,332, 9,751,992, 7,960,466, 9,758,627, 9,834,658 and 7,932,307, and US Patent Application Publications No. US2018/0179343A1, US2018/0179303, US2018/0230276A1 US2016/0185921A1, and US2016/0289398A1, the contents of which are incorporated herein by reference.

As one alternative wet masterbatch technique, rubber wet masterbatches are made in a process having a step (α) of dispersing the carbon black into the dispersing solvent to produce a carbon-black-containing slurry solution, a step (β) of mixing the carbon-black-containing slurry solution with the rubber latex solution to produce a carbon-black-containing rubber latex solution, and a step (γ) of solidifying/drying the carbon-black-containing rubber latex solution. When the carbon black is dispersed into the dispersing solvent, at least one portion of the rubber latex solution is added thereto, thereby producing the carbon-black-containing slurry solution in which rubber latex particles adhere to the carbon black, and the step (β) is a step (β-(a)) of mixing the carbon-black-containing slurry solution, in which the rubber latex particles adhere to the carbon black, with the rest of the rubber latex solution to produce the carbon-black-containing rubber latex solution in which rubber latex particles adhere to the carbon black. In the step (β-(a)), the slurry solution is mixed with the rest of the rubber latex solution to produce a carbon-black-containing rubber latex solution in which rubber latex particles adhere to the carbon black. The method for mixing the slurry solution with the rest of the rubber latex solution is not particularly limited, and may be a method of mixing the slurry solution with the rest of the rubber latex solution, using an ordinary dispersing machine such as a highly shearing mixer, a High Shear Mixer, a homo-mixer, a ball mill, a bead mill, a high-pressure homogenizer, an ultrasonic homogenizer or a colloid mill. As required, the whole of the dispersing machine or some other mixing system may be heated at the time of the mixing. Then, the carbon-black-containing rubber latex solution is solidified. The method for the solidification may be a method of adding a solidifier to the carbon-black-containing rubber latex solution, in which the rubber latex particles adhere to the carbon black, to yield a solidified product. The solidifier may be a substance used ordinarily to solidify a rubber latex solution, for example, an acid such as formic acid or sulfuric acid, or a salt such as sodium chloride. After the solidifying stage, the solution containing the solidified product is dried to yield each of the rubber wet masterbatches A and B. The method for drying the solution containing the solidified product maybe a method using a drying machine that may be of various types, such as an oven, a vacuum drier or an air drier.

In another alternative process to make the wet masterbatch or elastomer composite masterbatch, the method can include a mixing step of mixing a natural rubber latex with a slurry comprising water and a carbon black dispersed therein. Ten to 100 weight parts of the carbon black is mixed with 100 weight parts of a natural rubber component in the natural rubber latex. For instance, a natural rubber field latex can be diluted to a rubber content of 20% or other amount with deionized water. To the diluted natural rubber field latex, an anionic surfactant and an alkaline protease can be added. The mixture can be stirred, for instance at 40° C. for eight hours, whereby amide bonds in the natural rubber field latex were cleaved. For the carbon black slurry, a colloid mill can be used and deionized water and one of various carbon blacks can be charged in the slurry. The mixture is then stirred to form the slurry. For coagulation, the latex and carbon black slurry are charged into a homo-mixer. While stirring each mixture, an acid like formic acid is added to the mixture until the mixture reached pH 4.5 or other pH. A coagulated masterbatch is then recovered from the mixture, cleaned with water, and dehydrated until the water content thereof was reduced, for instance to about 40%. The masterbatch is then dried.

Suitable elastomer containing fluids include both natural and synthetic elastomer latices and latex blends. The latex should be appropriate for the wet masterbatch process selected and the intended purpose or application of the final rubber product. It will be within the ability of those skilled in the art to select suitable elastomer latex or a suitable blend of elastomer latices for use in the methods and apparatus disclosed here, given the benefit of this disclosure.

Exemplary elastomers for either the elastomer latex and/ or as an optional additive include, but are not limited to, rubbers, polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, propylene and the like. The elastomer may have a glass transition temperature (Tg), as measured by differential scanning calorimetry (DSC), ranging from about −120° C. to about 0° C. Examples include, but are not limited to, styrene-butadiene rubber, butadiene rubber, natural rubber and their derivatives such as epoxidized natural rubber, chlorinated rubber, polybutadiene, polyisoprene, poly(styrene-co-butadiene) and their derivatives, and the oil extended compositions comprising any of them. Blends of any of the foregoing may also be used. The latex may be in an aqueous carrier liquid. Particular suitable synthetic rubbers include: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, allyl-substituted acrylates, vinyl ketone, methyl isopropenyl ketone, methyl vinyl either, alphamethylene carboxylic acids and the esters and amides thereof such as acrylic acid and dialkylacrylic acid amide. Also, suitable for use herein are copolymers of ethylene and other high alpha olefins such as propylene, 1-butene and 1-pentene. As noted further below, the rubber compositions can contain, in addition to the elastomer and filler, a coupling agent, and optionally, various processing aids, oil extenders and antidegradants.

Exemplary natural rubber lattices include but are not limited to field latex, latex concentrate (produced, for example, by evaporation, centrifugation or creaming), skim latex (e.g., the supernatant remaining after production of latex concentrate by centrifugation) and blends of any two or more of these in any proportion. The latex should be appropriate for the wet masterbatch process selected and the intended purpose or application of the final rubber product. The latex is provided typically in an aqueous carrier liquid. Selection of a suitable latex or blend of lattices will be well within the ability of those skilled in the art given the benefit of the present disclosure and the knowledge of selection criteria generally well recognized in the industry.

The natural rubber latex may also be chemically or enzymatically modified in some manner. For example, it may be treated to chemically modify or reduce various non-rubber components, or the rubber molecules themselves may be modified with various monomers or other chemical groups such as chlorine. Exemplary methods of chemically modifying natural rubber latex are disclosed in European Patent Publications Nos. 1489102, 1816144, and 1834980, Japanese Patent Publications Nos. 2006152211, 2006152212, 2006169483, 2006183036, 2006213878, 2006213879, 2007154089, and 2007154095, U.S. Pat. Nos. 6,841,606 and 7,312,271, and U.S. Patent Publication No. 2005-0148723. Other methods known to those of skill in the art may be employed as well.

The particulate filler present in the elastomer composite masterbatch and/or used as an additive during dry mixing can be carbonaceous aggregated particulates, for example, carbon black, silicon-coated or silicon treated carbon blacks, silica, or any combinations or mixtures of two or more of these. Exemplary carbon blacks include ASTM N100 series—N900 series carbon blacks, for example N100 series carbon blacks, N200 series carbon blacks, N300 series carbon blacks, N500 series carbon blacks, N600 series carbon blacks, N700 series carbon blacks, N800 series carbon blacks, or N900 series carbon blacks. Carbon blacks sold under the Regal®, Black Pearls®, Spheron®, Sterling®, and Vulcan® trademarks available from Cabot Corporation, the Raven®, Statex®, Furnex®, and Neotex® trademarks and the CD and HV lines available from Birla Carbon (Columbian Chemicals,) and the Corax®, Durax®, Ecorax®, and Purex® trademarks and the CK line available from Evonik (Degussa) Industries, and other fillers suitable for use in rubber or tire applications, may also be exploited for use with various implementations. Suitable chemically functionalized carbon blacks include those disclosed in WO 96/18688 and US2013/0165560, the disclosures of which are hereby incorporated by reference. Mixtures of any of these carbon blacks may be employed.

Elastomer composite masterbatches or the elastomer compound can contain carbon blacks having a statistical thickness surface area (STSA, ASTM Standard D6556) of at least about 15 $m^2/g$, for example, from about 15 $m^2/g$ to about 240 $m^2/g$, e.g., from about 35 $m^2/g$ to about 230 $m^2/g$, from about 50 $m^2/g$ to about 200 $m^2/g$, from about 60 $m^2/g$ to about 180 $m^2/g$, from about 100 $m^2/g$ to about 200 $m^2/g$.

Carbon blacks having any of the above surface areas may additionally have a structure, as given by the oil adsorption number for the compressed carbon black (COAN, ASTM D3493), of from about 50 to about 115 mL/100 g, for example, from about 65 to about 75 mL/100 g, from about 60 to 95 mL/100 g, from about 75 to about 85 mL/100 g, from about 85 to about 95 mL/100 g, from about 95 to about 105 mL/100 g, or from about 105 to about 115 mL/100 g.

The materials described herein as silicon-treated carbon blacks are not limited to carbon black aggregates which have been coated or otherwise modified. They also may be a different kind of aggregate having two phases. One phase is carbon, which will still be present as graphitic crystallite and/or amorphous carbon, while the second phase is silica (and possibly other silicon-containing species). Thus, the silicon-containing species phase of the silicon-treated carbon black is an intrinsic part of the aggregate; it is distributed throughout at least a portion of the aggregate. A variety of silicon-treated blacks are available from Cabot Corporation under the Ecoblack™ name and are described in more detail in U.S. Pat. No. 6,028,137. It will be appreciated that the multiphase aggregates are quite different from the silica-coated carbon blacks mentioned above, which consist of pre-formed, single phase carbon black aggregates having silicon-containing species deposited on their surface. Such carbon blacks may be surface-treated in order to place a silica functionality on the surface of the carbon black aggregate as described in, e.g., U.S. Pat. Nos. 6,929,783, 6,541,113 and 5,679,728.

As noted above, additives may be used, and in this regard coupling agents useful for coupling silica or carbon black may be useful with the silicon-treated carbon blacks. Carbon blacks and numerous other particulate fillers suitable for use in elastomer compositions, such as silica, zinc oxide, aluminum oxide, other metal oxides, calcium carbonate and other particulate materials, are commercially available and are known to those skilled in the art. For example, precipitated silica filler in any form, such as highly dispersible (HDS) granules, non-HDS granules, silica aggregates and silica particles; colloidal silica; fumed silica; and any combinations thereof, may be used, with or without coupling agents present, in wet masterbatch compositions and/or as an additional filler in the dry mixing process. Such silicon dioxide or silicon dioxide coated particles may have been chemically treated to include functional groups bonded (attached (e.g., chemically attached) or adhered (e.g., adsorbed)) to the silica surface. Examples of suitable grades of HDS include Perkasil® GT 3000GRAN silica from WR Grace & Co, Ultrasil® 7000 silica from Evonik Industries, Zeosil® 1165 MP and 1115 MP silica from Solvay S.A., Hi-Sil® EZ 160G silica from PPG Industries, Inc., and Zeopol® 8741 or 8745 silica from JM Huber Corporation. Examples of suitable grades of conventional (non-HDS) precipitated silica include Perkasil® KS 408 silica from WR Grace & Co, Zeosil® 175GR silica from Solvay S.A., Ultrasil® VN3 silica from Evonik Industries, Hi-Sil® 243 silica from PPG Industries, Inc. and the Hubersil® 161 silica from JM Huber Corporation. Examples of suitable grades of hydrophobic precipitated silica include Agilon®400, 454, or 458 silica from PPG Industries, Inc. and Coupsil® silicas from Evonik Industries, for example Coupsil® 6109 silica.

One or more additives also may be pre-mixed, if suitable, with the particulate slurry or with the elastomer containing fluid, or as indicated can be combined with the elastomer composite masterbatch during the dry mixing step of the present invention. Other pre-mixtures may be used. In one implementation, a liquid elastomer composite masterbatch comprising carbon black is compounded in dry form with a second elastomer masterbatch, i.e., one comprising silica filler. By introducing silica filler in a separately produced masterbatch, the silica filler can be dry mixed with an elastomer, e.g., NR, BR, SBR or IR, at a temperature of at least 130° C., to optimize the dynamic and mechanical reinforcement properties of the silica filler in the second elastomer composite. Subsequently, low temperature compounding of the elastomer composite masterbatch with such a silica masterbatch allows optimization of the dynamic and mechanical reinforcement properties of silica and other fillers in the compound made with these two masterbatches. These mixing steps are most beneficial in compounds comprising at least 10 phr silica filler and at least 30 phr carbon black. Alternatively, the second elastomer composite containing silica filler may be produced in a liquid masterbatch process, such as the processes disclosed in U.S. Pat. Nos. 10,000,612, 9,260,594 and 9,988,502, which are hereby incorporated by reference.

In one implementation, the wet masterbatch crumb or coagulum is passed from a coagulum reactor of the type disclosed in U.S. Pat. No. 6,929,783 to a de-watering extruder via a simple gravity drop or other suitable apparatus known to those of skill in the art. The dewatering extruder may bring the elastomer composite from, e.g., approximately 70-85% water content, to a desired water content, e.g., approximately 1% to 25% water content, for example, from about 8 to about 25% water content or from about 10 to about 20% water content. The optimal water content may vary with the elastomer employed, the type of filler, and the desired downstream processing procedure. Suitable de-watering extruders are well known and commercially available from, for example, the French Oil Mill Machinery Co. (Piqua, Ohio, USA).

As an exemplary summary, the elastomer composite masterbatch can comprise:
 i) combining a first fluid comprising elastomer latex with a second fluid comprising particulate filler;
 ii) causing the elastomer latex to coagulate, thereby forming masterbatch crumb; and iii) drying the elastomer composite masterbatch (e.g. to obtain masterbatch crumb).

The drying, as an option, can comprise reducing the water content of the masterbatch crumb thereby forming a dewatered coagulum; subjecting the dewatered coagulum to mechanical energy, thereby causing the dewatered coagulum to heat as a result of friction, while allowing the dewatered coagulum, for instance, to achieve a temperature of about 130° C. to about 190° C., wherein water content is reduced to about 0.5% to about 3% and wherein substantially all of the decrease in water content is accomplished by evaporation, thereby producing a masticated masterbatch; and subjecting the masticated masterbatch to at least an additional 0.3 MJ/kg of mechanical energy while further reducing the water content as described in U.S. Pat. No. 8,586,651.

The elastomer composite masterbatch can further include, before dry mixing, masticating the elastomer masterbatch composite, such as for 30-60 seconds. As an example, the masticating can comprise mixing the elastomer masterbatch composite in an internal mixer, such as at a fill factor of 70-85% for 30 to about 60 seconds.

As indicated, the at least one additive can be a curative package or at least one curing agent. To vulcanize the elastomer compound, the curative package added can include a cross-linking agent, any necessary activators and accelerators, anti-oxidant, and additional optional additives such as various processing aids, oil extenders, wax, and additional antidegradants. Where sulfur is used as a cross-linking agent, typical accelerators include zinc oxide and or stearic acid, and typical activators include sulfenamides such as N-tert-butyl-2-benzothiazole sulfenamide (TBBS) and N-cyclohexyl-2-benzothiazole sulfonamide (CBS). Anti-oxidants include N-(1,3-dimethylbutyl)-N'-phenyl-p-phenylenediamine (6PPD) and those listed in WO2012/037244. Other curatives used in rubber processing are peroxides, urethane crosslinkers, metallic oxides, acetoxysilane compounds, and so forth. Additional suitable components for sulfur-based and other cross-linking systems are well known to those of skill in the art.

As an example, in a compounding step (which can be the dry mixing step), the additives, with the exception of the sulfur or other cross-linking agent and accelerator, are combined with the neat elastomer composite in a mixing apparatus (the non-curatives are often collectively termed "smalls"). The most common mixing apparatus is the internal mixer, e.g., the Banbury or Brabender mixer, having intermeshing or tangential technology, but other mixers, such as extruders, may also be employed. Thereafter, in a second mixing step, the cross-linking agent, e.g., sulfur, and accelerator (if necessary) (collectively termed curatives) are added. The second mixing step is frequently performed in the same type of apparatus as the first mixing step but may be performed on a different type of mixer or extruder or on a roll mill. One of skill in the art will recognize that, once the curatives have been added, vulcanization will commence once the proper activation conditions for the cross-linking agent are achieved. Thus, where sulfur is used, it is important to maintain the temperature below the cure temperature during mixing.

In one implementation, where the additive includes an additional elastomer, the wet elastomer composite masterbatch employs NR latex, while the second elastomer material introduced during dry mixing is butadiene rubber (BR), styrene-butadiene rubber (SBR), or isoprene rubber (IR). With respect to proportions, BR, IR, or SBR additives may be present in the elastomer compound in an amount from about 5 to about 50% by weight, for example, from about 5% to about 10%, from about 10% to about 20%, from about 20% to about 30%, from about 30% to about 40%, or from about 40% to about 50%, or from about 20% to 80% of total elastomer in the elastomer compound.

Regarding properties of the elastomer compound, the modulus ratio of certain vulcanized elastomer compounds of the present invention may be at least about 5% greater, for example, from about 10% to about 12%, from about 12% to about 15%, or from about 15% to about 17% greater than that for a vulcanized elastomer compound having the same composition but produced by dry mixing with the addition of the same additive at a temperature of at least 130 deg C. Alternatively, or in addition, the modulus ratio may be at least 0.25 greater or at least 0.5 greater, preferably at least about 0.75 greater, most preferably at least about 1 greater, for example, up to about 2.2 greater, up to about 2 greater, up to about 1.75 greater, or up to about 1.5 greater, than the modulus ratio for a vulcanized elastomer compound having the same composition but produced by dry mixing with the addition of the same additive at a temperature of at least 130 deg C.

The ratio M300/M100 (also termed "modulus ratio" herein) provides an indication of the rubber reinforcement. For carbon black-filled vulcanizates, stresses at given elongations reflect, among other things, the effect of filler morphology (particle size and structure) and surface activity, which determines filler-polymer and aggregate-aggregate interaction. The ratio of the stress at 300% elongation to that at 100% elongation, M300/M100 (also referred to as $T_{300}/T_{100}$) provides a useful approach for quantifying the degree of polymer-filler interaction because the factors governing the stresses at different elongations are different. Without wishing to be bound by theory, it presently is understood that, at least in certain preferred implementations, the elastomer compound produced by the wet/dry method disclosed here is a multi-phase composition. The degree of intermingling of the two phases and the degree to which boundary layers between the two phases are more or less distinct will depend on numerous factors including, for example, the mutual affinity of the first elastomer and the second elastomer material, the relative affinity of the filler(s) for one or more of the elastomers, the level of particulate loading, the choice of particulate filler(s), the relative weight proportion of the first elastomer and the second elastomer material, the effectiveness of the blending of the neat elastomer composite and second elastomer material, etc.

The elastomer compound produced by the present invention may be used in the manufacture of rubber articles, including, but not limited to a vehicle tire tread, sidewall, wire skim component, or a tire carcass, or an engine mount, bushing, conveyor, belt, anti-vibration device, or windshield wiper, or a seal, gasket, hose, liner or vehicle wheel or track element.

The present invention includes the following aspects/embodiments/features in any order and/or in any combination: The present invention can include any combination of these various features or embodiments above and/or below as set forth in sentences and/or paragraphs. Any combination of disclosed features herein is considered part of the present invention and no limitation is intended with respect to combinable features.

EXAMPLES

Materials and Methods

Unless noted otherwise below, all times are given in seconds and percentages in weight.

Wet Masterbatch Methods

Carbon Black Slurry Preparation

Dry carbon black (N134) (Cabot Corporation, Boston, Mass.) was mixed with water and ground to form a slurry having a concentration of about 16%. The slurry was fed to a mixing zone, of a coagulum reactor as shown in FIGS. 2-4 and 7 of U.S. Pat. No. 6,929,783 by a homogenizer fitted with a Homogenizing Valve at an operating pressure of around 3000 psig such that the slurry was introduced as a jet into the mixing zone of a coagulum reactor as a finely ground carbon black slurry. The carbon black slurry flow rate was adjusted to about 1200-2500 kg/hr to modify final carbon black loading levels and achieve the desired production rate. The actual carbon black loading levels were determined by nitrogen pyrolysis or thermogravimetric analysis (TGA). Specific CB grades and loadings are specified in the Examples below.

Natural Rubber Latex Delivery

Field latex having a dry rubber content of about 27-31% was pumped to a mixing portion of a coagulum reactor configured similarly to that shown in FIGS. 2-4 and 7 of U.S. Pat. No. 6,929,783. The latex flow rate was adjusted between about 1000-2500 kg/h in order to modify final carbon black loading levels.

Carbon Black and Latex Mixing

The carbon black slurry and latex were mixed by entraining the latex into the carbon black slurry in the mixing zone of the coagulum reactor. During the entrainment process, the carbon black was intimately mixed into the latex and the mixture coagulated.

Dewatering

The masterbatch crumb was discharged from the coagulum reactor at a rate between 500 and 1000 kg/hr (dry weight) and dewatered to about 10-20% moisture with a dewatering extruder (The French Oil Machinery Company, Piqua, Ohio) as illustrated in FIG. 1, and described in the text of U.S. Pat. No. 6,929,783. In the extruder, the masterbatch crumb was compressed, and water squeezed from the crumb was ejected through a slotted barrel of the extruder.

Drying

The dewatered coagulum was dropped into a continuous compounder (Farrel Continuous Mixer, #7 and #15 rotors; 280-320 rpm (FCM), Farrel Corporation) where it was masticated and mixed with 1-2 phr of antioxidant (6PPD) in a process described in U.S. Pat. No. 8,586,651. The moisture content of the masticated masterbatch exiting the FCM was around 1-2% and the temperature was between 140 and 180° C. The product was further masticated, cooled and dried on an open mill. The product was further cooled in a cooling conveyor and cut into small strips, which were compressed together, to form a "loose" product bale.

Blending and Curing

The bales of elastomer composite masterbatch were opened and the masterbatch was compounded according to the formulation in Table 1 and the procedures outlined in Table 2. The amounts of masterbatch and unfilled rubber total was such that the final compound comprised 50 phr carbon black.

TABLE 1

| Ingredient | Phr |
| --- | --- |
| Masterbatch | Variable |
| Unfilled Rubber | Variable |
| ZnO | 4 |
| Stearic acid | 2.5 |
| 6PPD* (antioxidant) | 1.0 |
| SantoCure CBS** | 0.8 |
| Sulfur | 1.2 |

*N-(1,3-dimethylbutyl)-N'-phenyl-p-phenylenediamine

**N-cyclohexyl-2-benzothiazole sulfenamide

TABLE 2

("2-Stage") Low T Process

| | Time (min) | Operation |
| --- | --- | --- |
| Stage 1 | | Farrel BR Banbury mixer (1600 cc), 70% fill factor, 60 rpm, 60° C.; adjust speed to maintain temperature below 130° C. |
| | 0 | Add rubber-carbon black masterbatch |
| | 0.5 | Add second elastomer material (if used) |
| | 1 | Sweep; Add zinc oxide, stearic acid and 6PPD smalls (preblended) |
| | 2 | Sweep |
| | 2.5 | Dump at < 120 to less than 130° C. Roll mill using 6 end rolls, rest at least 3 hours |
| Stage 2 | | Farrel BR Banbury mixer (1600 cc), 65% fill factor, 60 rpm, 50° C. |
| | 0 | Add stage 1 compound, sulfur and accelerator |
| | 0.5 | Sweep |
| | 1 | Dump at < 120° C. Roll mill for one minute with adequate band. Remove and perform 6 end rolls. Sheet off to required thickness. |

TABLE 2

("2-Stage") High T Process

| | Time (min) | Operation |
| --- | --- | --- |
| Stage 1 | | Farrel BR Banbury mixer (1600 cc), 70% fill factor, 80 rpm, 80° C.; adjust speed to maintain temperature at or above 130° C. but not to exceed 150° C. |
| | 0 | Add rubber-carbon black masterbatch |
| | 0.5 | Add second elastomer material (if used) |
| | 1 | Sweep; Add zinc oxide, stearic acid and 6PPD smalls (preblended) |
| | 2 | Sweep |
| | 3-4 | Dump at 140-150° C. Roll mill using 6 end rolls, rest at least 3 hours |
| Stage 2 | | Farrel BR Banbury mixer (1600 cc), 65% fill factor, 60 rpm, 50° C. |
| | 0 | Add stage 1 compound, sulfur and accelerator |
| | 0.5 | Sweep |
| | 1 | Dump at < 120° C. Roll mill for one minute with adequate band. Remove and perform 6 end rolls. Sheet off to required thickness. |

One Stage Mixing ("1 Stage")

Unless otherwise specified, compounds designated as having been compounded using a one stage mixing procedure were compounded using the formulation in Table 1 and the procedure in Table 3 below.

TABLE 3

| Time | Operation |
|---|---|
| | Farrel BR Banbury mixer (1600 cc), 65% fill factor, 60 rpm, 60° C. |
| 0 | Add elastomer composite |
| 0.5 | Add smalls (preblended), curatives and (if used) second elastomer material |
| 1 | Sweep |
| 2 | Sweep |

TABLE 3-continued

| Time | Operation |
|---|---|
| 2.5 to 3 | Dump; adjust rpm to maintain temperature < 120° C. |
| 3 | Roll mill using 6 end rolls. Rest at least 3 hours |

Vulcanization was carried out in a heated press set at 150° C. for a time determined by a conventional rubber rheometer (i.e., T90+10% of T90, where T90 is the time to achieve 90% vulcanization).

Properties of Filled Compositions

The M300 and M100 tensile properties of vulcanized samples were measured according to ASTM standard D-412. The modulus ratio is the ratio of M300/M100, i.e., the ratio of the stress of the material at 300% and 100% strain. Tan delta 60° was determined using a dynamic strain sweep between 0.01% and 60% at 10 Hz and 60° C. Tan omax was taken as the maximum value of tan δ within this range of strains.

Example 1

This example was undertaken to study the effects of compounding (dry mixing) an elastomer composite masterbatch made by a liquid process at low temperature, i.e., less than 130 deg C. ("Low T" process), compared to dry mixing at higher temperatures, i.e., 130 deg C. and above ("High T" process). The Stage 2 temperature when used was always below 120 deg C. for the High T and Low T examples, as curatives were used in Stage 2.

As shown in the data below, in Table 4, the modulus ratio was significantly higher when the Low T process of dry mixing was used (samples 1-a, 1-b, 1-c and 1-j), compared to when the High T process of dry mixing was used (samples 1-d, 1-e, 1-f, 1-g, 1-h and 1-i) to compound the elastomer composite masterbatch. Further, the tan delta (60° C.) of the resulting elastomer compound was lower (lower is better) for elastomer compounds using Low T process dry mixing compared to elastomer compounds using High T process dry mixing. Carbon black dispersion was acceptable in all samples (i.e., less than 10% undispersed area of carbon black particles of at least 10 micrometers in a largest dimension).

TABLE 4

| Example NR/N134 CB MB | Process | Stage 1 Temp. ° C. | Stage 2 Temp. ° C. | Stage 1 Time seconds | Stage 1 Energy kWhr | M300 [MPa] | M300/M100 [-] | Max Tan (δ) 60° C. |
|---|---|---|---|---|---|---|---|---|
| 1-a | 2-Stage Low T | 122 | 94 | 150 | .30 | 16.02 | 6.68 | 0.165 |
| 1-b | 2-Stage Low T | 120 | 98 | 150 | .26 | 17.08 | 6.71 | 0.171 |
| 1-c | 2-Stage Low T | 121 | 99 | 150 | .25 | 17.56 | 6.70 | 0.166 |
| 1-d | 2-Stage High T | 131 | 94 | 120 | .26 | 18.83 | 6.24 | 0.181 |
| 1-e | 2-Stage High T | 136 | 94 | 150 | .30 | 17.96 | 6.19 | 0.183 |
| 1-f | 2-Stage High T | 139 | 96 | 180 | .35 | 19.04 | 6.24 | 0.191 |
| 1-g | 2-Stage High T | 139 | 96 | 300 | .49 | 18.49 | 6.25 | 0.192 |
| 1-h | 2-Stage High T | 142 | 94 | 480 | .70 | 17.59 | 6.35 | 0.194 |
| 1-i | 2-Stage High T | 138 | 99 | 120 | .22 | 16.95 | 6.40 | 0.190 |
| 1-j | 1-Stage Low T | 122 | N/A | 150 | .23 | 17.72 | 6.49 | 0.173 |

Example 2

This example was undertaken to illustrate the benefits of the Low T process for compounding elastomer composite masterbatch with the same, or with different, elastomer additive.

The elastomer composite masterbatch ("MB") was made according to the EXAMPLES Materials and Methods, as described above, except that PROPEL® E7 carbon black obtained from Cabot Corporation, Boston, Mass., was used in the MB. In MB samples blended with butadiene rubber as the elastomer additive, BUNA® CB22 butadiene rubber, obtained from Lanxess, Cologne, Germany, was used. In MB samples blended with natural rubber as the elastomer additive, SMR20 natural rubber, obtained from Lee Rubber, Kuala Lumpur, Malaysia, was used.

Blending and Curing

All of the MB samples were compounded by the Low T process, according to the formulation in Table 1 and the procedure outlined in Table 2 ("2 Stage") Low T Process. The amounts of MB and unfilled second elastomer additive (either "NR" natural rubber, or "BR" butadiene rubber) were selected such that the final compound comprised a diluted amount of carbon black (41, 44 or 50 phr CB) relative to the starting MB (55 phr carbon black) as set forth in Table 5.

Compound properties were measured by the methods described in the Examples above. Montech VMV3000 equipment (MonTech USA LLC, Columbia City, Ind.), set at ML(1+4)@100C Mooney profile (large rotor, 1 minute preheat, 4 minute test), was used to measure Mooney values.

Results

As shown in Table 5, hysteresis and mechanical reinforcement properties were favorable for compounds comprising MB made with 50 phr PROPEL® E7 carbon black and NR elastomer additives. Carbon black dispersion was acceptable in all samples (i.e., less than 10% undispersed area of carbon black particles of at least 10 micrometers in a largest dimension). Tan delta decreased at 44 and 41 phr CB, while mechanical reinforcement properties, M300 and M300/M100, unexpectedly improved in the 44 and 41 phr carbon black samples, relative to the 50 phr carbon black samples. Further, the Low T Stage one process used to disperse the elastomer additive into the MB was carried out over a short period of mixing time at low energy consumption relative to several of the High T processes carried out in Example 1. In one of the High T process samples of Example 1, sample 1-f, Stage one mixing was carried out for 180 seconds with energy input of 0.35 kWhr, but the compound properties of hysteresis and M300/M100 mechanical reinforcement produced were inferior to comparable Low T process samples described in Table 5 made with a Stage one mixing time of 180 seconds and less energy (0.27 to 0.30 kWhr). The was observed even in Example 2 invention samples having lower carbon black contents (44 and 41 phr).

The Mooney viscosity values (ML 1+4 @ 100° C.) measured for the samples in Table 5 indicate that the Low T process and the blended elastomer materials made by the process are satisfactory for use of these compounds in further processing operations to fabricate finished rubber articles.

Example 3

This example was undertaken to study the effects of Low T process versus High T process compounding for various carbon blacks in the MB, for various elastomer additives, and for a second elastomer composite masterbatch ("MB2") additives, and to compare the use of MB in dry mix compounding to dry mix compounding done without using MB.

Blending and Curing

The dry mixed compounds that did not contain MB were made according to the formulation in Table 6 and the process outlined in Table 7 Dry Mix Process.

The MB2 masterbatch additives were made according to the formulations in Table 8 and the process outlined in Table 9 Second Masterbatch Process. The MB and MB2 masterbatches were compounded according to the formulation in Table 10 and the Low T and High T Processes of Table 11 using the BR and NR elastomer additives described in Example 2.

All other MB samples were compounded by either the Low T process or the High T process, according to the formulation in Table 1 and the processes outlined in Table 11, using the BR and NR elastomer additives described in Example 2. The compounding process selected for each sample is shown in Table 12. The amounts of MB, unfilled second elastomer additive and MB2 additive were selected such that the final compound comprised a diluted amount of carbon black (44 or 50 phr CB) relative to the starting MB (containing 50 or 55 phr carbon black) as set forth in Table 10. The carbon blacks used in the MB were N134 ("A"), PROPEL® E7 ("B") or CRX1346™ ("C") carbon blacks, obtained from Cabot Corporation, Boston, Mass. Compound properties were measured by the methods described in the Examples above.

TABLE 5

| MB Sample Initial phr CB | Elastomer Additive[a] Final phr CB[b] | Stage 1 Temp. ° C. | Stage 2 Temp. ° C. | Stage 1 Time seconds | Stage 1 Energy kWhr | M300 [MPa] | M300/M100 Ratio [-] | Max Tan (δ) 60° C. | Stage 1 Mooney (1 + 4) |
|---|---|---|---|---|---|---|---|---|---|
| MB-1 55phr | NR 50phr | 118 | 96 | 180 | 0.29 | 20.20 | 6.39 | 0.144 | 72.6 |
| MB-1 55phr | NR 50phr | 118 | 97 | 180 | 0.30 | 20.32 | 6.39 | 0.148 | 72.0 |
| MB-1 55phr | NR 44phr | 116 | 94 | 180 | 0.27 | 16.55 | 7.01 | 0.133 | 64.1 |
| MB-1 55phr | NR 44phr | 116 | 94 | 180 | 0.28 | 17.76 | 6.99 | 0.128 | 63.2 |
| MB-1 55phr | NR 41phr | 116 | 91 | 180 | 0.27 | 15.47 | 7.06 | 0.118 | 60.4 |
| MB-1 55phr | NR 41phr | 115 | 93 | 180 | 0.27 | 14.96 | 6.99 | 0.122 | 61.3 |
| MB-1 55phr | BR 50phr | 115 | 102 | 180 | 0.30 | 19.34 | 6.49 | 0.154 | 76.6 |
| MB-1 55phr | BR 50phr | 122 | 102 | 180 | 0.30 | 19.18 | 6.29 | 0.152 | 77.0 |
| MB-1 55phr | BR 44phr | 121 | 102 | 180 | 0.29 | 16.27 | 6.28 | 0.132 | 73.9 |
| MB-1 55phr | BR 44phr | 120 | 102 | 180 | 0.28 | 15.70 | 6.21 | 0.137 | 73.9 |
| MB-1 55phr | BR 41phr | 119 | 102 | 180 | 0.28 | 14.92 | 6.27 | 0.125 | 73.5 |
| MB-1 55phr | BR 41phr | 119 | 102 | 180 | 0.28 | 14.68 | 6.02 | 0.13 | 73.0 |

[a]NR = Natural rubber;
BR = Butadiene rubber
[b]CB = PROPEL ® E7 carbon black

TABLE 6

Dry Mix

| Ingredient | phr | phr |
|---|---|---|
| NR/BR | — | 80/20 |
| NR | 100 | — |
| Carbon Black | Variable | Variable |
| ZnO | 4 | 4 |
| Stearic acid | 2.0 | 2.0 |
| 6PPD* (antioxidant) | 1.5 | 1.5 |
| SantoCure BBTS** | 0.8 | 0.8 |
| Sulfur | 1.2 | 1.2 |

*N-(1,3-dimethylbutyl)-N'-phenyl-p-phenylenediamine
**N-tert-butyl-2-benzothiazole sulfonamide

TABLE 7

Dry Mix Process

| | Time (min) | Operation |
|---|---|---|
| Stage 1 | | Farrel BR Banbury mixer (1600 cc), 70% fill factor, 80 rpm, 50° C.; adjust speed to maintain temperature below 150° C. |
| | 0 | Add rubbers |
| | .5 | Add ⅔ Filler |
| | 1 | Sweep/Add Remaining Filler |
| | 2 | Add zinc oxide, stearic acid and 6PPD smalls (preblend) Sweep; Dump at < 150° C. Roll mill using 6 end rolls, rest at least 3 hours |
| Stage 2 | | Farrel BR Banbury mixer (1600 cc), 65% fill factor, 60 rpm, 50° C. |
| | 0 | Add stage 1 compound, sulfur and accelerator |
| | 0.5 | Sweep |
| | 1 | Dump at < 120° C. Roll mill for one minute with adequate band. Remove and perform 6 end rolls. Sheet off to required thickness. |

TABLE 8

MB2 Formulations

| | MB2 (1) | MB2 (2) |
|---|---|---|
| Ingredient | Phr | phr |
| NR/BR | 90/10 | 90/10 |
| Carbon Black | 50 CB (B) | 50 CB (A) |
| ZnO | 5 | 4 |
| Stearic acid | 2.0 | 2.0 |
| 6PPD* (antioxidant) | 1.5 | 1.5 |

*N-(1,3-dimethylbutyl)-N'-phenyl-p-phenylenediamine

TABLE 9

Second Masterbatch Process

| | Time (min) | Operation |
|---|---|---|
| Stage 1 | | Farrel BR Banbury mixer (1600 cc), 70% fill factor, 80 rpm, 80° C.; adjust speed to achieve temperature of 150° C. |
| | 0 | Add NR and BR |
| | 1 | Add ⅔ Filler |
| | 2 | Sweep/Add Remaining Filler |
| | 3 | Add zinc oxide, stearic acid and 6PPD smalls (preblended) |
| | 3.5 | Sweep |
| | 4 | Dump, adjust temperate to achieve, but not exceed 150° C. Roll mill using 6 end rolls, rest at least 3 hours |

TABLE 10

MB & MB2 Blend Compound

| Ingredient | Phr |
|---|---|
| MB | 121.8 |
| MB2 | 28.5 |
| ZnO | 3.2 |
| Stearic acid | 1.6 |
| 6PPD* (antioxidant) | 0.4 |
| SantoCure CBS** | 0.8 |
| Sulfur | 1.2 |

*N-(1,3-dimethylbutyl)-N'-phenyl-p-phenylenediamine
**N-cyclohexyl-2-benzothiazole sulfenamide

TABLE 11

MB & MB2 Compound Low T Process

| | Time (min) | Operation |
|---|---|---|
| Stage 1 | | Farrel BR Banbury mixer (1600 cc), 70% fill factor, 60 rpm, 60° C.; adjust speed to maintain temperature below 130° C. |
| | 0 | Add rubber-carbon black masterbatch |
| | 0.5 | Add second elastomer material (if used) |
| | 1 | Sweep; Add zinc oxide, stearic acid and 6PPD smalls (preblended) |
| | 2 | Sweep |
| | 2.5 | Dump at from 120° to up to 130° C. Roll mill using 6 end rolls, rest at least 3 hours |
| Stage 2 | | Farrel BR Banbury mixer (1600 cc), 65% fill factor, 60 rpm, 50° C. |
| | 0 | Add stage 1 compound, sulfur and accelerator |
| | 0.5 | Sweep |
| | 1 | Dump at < 120 □C. Roll mill for one minute with adequate band. Remove and perform 6 end rolls. Sheet off to required thickness. |
| Stage 1 | | Farrel BR Banbury mixer (1600 cc), 70% fill factor, 80 rpm, 80° C.; adjust speed to maintain temperature at or above 130° C. but not to exceed 150° C. |
| | 0 | Add rubber-carbon black masterbatch |
| | 0.5 | Add second elastomer or MB2 |
| | 1 | Sweep; Add zinc oxide, stearic acid and 6PPD smalls (preblended) |
| | 2 | Sweep |
| | 3-4 | Dump; adjust rpm to achieve from 140° up to 150° C. Roll mill using 6 end rolls, rest at least 3 hours |
| Stage 2 | | Farrel BR Banbury mixer (1600 cc), 65% fill factor, 60 rpm, 50° C. |
| | 0 | Add stage 1 compound, sulfur and accelerator |
| | 0.5 | Sweep |
| | 1 | Dump at < 120° C. Roll mill for one minute with adequate band. Remove and perform 6 end rolls. Sheet off to required thickness. |

Vulcanization was carried out in a heated press set at 150° C. for a time determined by a conventional rubber rheometer (i.e., T90+10% of T90, where T90 is the time to achieve 90% vulcanization).

TABLE 12

| Sample MB/Dry phr CB A, B, C[a] | Elastomer Additive[b,c] Final phr CB | Mixing Process | Stage 1 Temp. °C. | Stage 2 Temp. °C. | Stage 1 Time seconds | Stage 1 Energy kWhr | Mooney (1+4) | M300 [MPa] | M300/M100 ratio[-] | Max Tan (δ) 60° C. |
|---|---|---|---|---|---|---|---|---|---|---|
| 1-a MB (A) 50 phr | None 50 phr | 2 Stage Low T | 119 | 103 | 150 | 0.30 | 77.7 | 17.15 | 6.75 | 0.173 |
| 1-d MB (A) 50 phr | None 50 phr | 2 Stage High T | 151 | 100 | 270 | 0.44 | 70.5 | 17.33 | 6.55 | 0.19 |
| 1-g Dry (A) 50 phr | None 50 phr NR | 2 Stage Dry | 155 | 102 | 300 | 0,43 | 69.6 | 15.34 | 5.46 | 0.204 |
| 1-i MB (A) 55 phr | BR 20phr 44 phr | 2 Stage Low T | 120 | 104 | 180 | 0.27 | 84.1 | 15.43 | 6.02 | 0.176 |
| 1-I MB (A) 55 phr | MB2-(2)[c] 50 phr | 2 Stage Low T | 120 | 108 | 180 | 0.27 | 82.8 | 17.13 | 5.8 | 0.188 |
| 1-m Dry (A) 50 phr | None 50 phr in 80/20 NR/BR | 2 Stage Dry | 154 | 110 | 300 | 0.44 | 82,5 | 14.12 | 5.25 | 0.196 |
| 1-b MB (B) 50 phr | None 50 phr | 2 Stage Low T | 120 | 103 | 150 | 0.25 | 80.2 | 21.65 | 5.72 | 0.184 |
| 1-e MB (B) 50 phr | None 50 phr | 2 Stage High T | 157 | 101 | 270 | 0.44 | 74.9 | 21.15 | 5.67 | 0.179 |
| 1-h MB (B) 55 phr | BR 20phr 44 phr | 2 Stage Low T | 122 | 107 | 180 | 0.27 | 76.9 | 15.96 | 6.2 | 0.147 |
| 1-k MB (B) 55 phr | MB2-(1)[c] 50 phr | 2 Stage Low T | 124 | 109 | 180 | 0.28 | 84.1 | 18.87 | 5.82 | 0.142 |
| 1-c MB (C) 50 phr | None 50 phr | 2 Stage Low T | 117 | 102 | 150 | 0.25 | 78.2 | 18.01 | 6.92 | 0.186 |
| 1-f MB (C) 50 phr | None 50 phr | 2 Stage High T | 153 | 101 | 270 | 0.44 | 70.5 | 17.33 | 6.55 | 0.19 |

[a]Sample carbon black A = N134,
B = Propel ® E7 carbon black and C = CRX1346 ™ carbon black.
[b]NR = Natural rubber;
BR = Butadiene rubber (80:20, NR:BR)
[c]See Tables 8 and 9 for MB2 masterbatch additive: NR/BR 90/10 elastomer blends with 50 phr of either (A) or (B) carbon black.

Results

Data in Table 12 demonstrate that, relative to either the High T process with MB or a conventional Dry Mix process without MB, the Low T process yielded improved M300 and M300/M100 reinforcement properties, and, with one exception for carbon black B, improved tan delta in compounds made with either neat MB, or MB blended with an elastomer additive, or MB blended with a MB2 masterbatch additive, in formulations containing various reinforcing carbon black fillers and elastomer additives. Such benefits of the Low T process were observed notwithstanding the lower temperature, shorter time and lesser amount of energy introduced to the elastomeric materials during Stage one of mixing. Carbon black dispersion was acceptable in all examples (i.e., less than 10% undispersed area of carbon black particles of at least 10 micrometers in a largest dimension). Mooney viscosity data (i.e., values in the range 65 to 95 for 50 phr filler, with a target around 70-80, and a preference for the higher end of the range) confirm the Low T process, and the blended elastomer materials made by the process, are satisfactory for use of the compounds in further processing operations for fabricating finished rubber articles. Overall, these data demonstrate the Low T process for dry mixing compounds from MB is a more energy efficient process capable of producing improved, and/or equivalent elastomeric compounds relative to those made by conventional, less efficient, mixing processes.

Example 4

This example was undertaken to study the effects of Low T process versus High T process compounding for blending silica filler and elastomer additives into a MB, specifically the effects of Low T process versus High T process compounding for blends of two masterbatches, one being the MB made according to the EXAMPLES Materials and Methods, as described above and the other a MB2 masterbatch comprising silica.

Blending and Curing

The MB samples were compounded by either the Low T process or the High T process, according to the formulation in Table 1 and the processes identified in Tables 19-1 and 19-2, below. The samples containing pre-coupled silica and elastomer additives were prepared according to the formulations in Table 13 and they were compounded with MB by either the Low T process or the High T process in Table 14. The MB2 additives containing silica were made according to the formulation in Table 15 and the process outlined in Table 16. The MB and MB2 masterbatches were compounded according to the formulation in Table 17 and either the Low T Process or the High T Processes of Table 18.

The elastomer additive was the NR described in Example 2. The silica filler additive was either Zeosil®1165MP silica, obtained from Solvay S.A., or Agilon®400GD pre-coupled (hydrophobic) silica, obtained from PPG Industries, Inc. These additives were used in the final compound in the amounts indicated in Tables 19-1 and 19-2. The amounts of MB, MB2, silica, NR and other additives were selected such that the final compound comprised 50 phr filler. The carbon black used in the MB was either N134 carbon black or Propel® E7 carbon black, obtained from Cabot Corporation, Boston, Mass.

Compound properties were measured by the methods described in the Examples above. Tear values were measured by the ASTM D-624-B method.

TABLE 13

Silica Formulations

| Ingredient | 1 phr | 2 phr | 3 phr |
|---|---|---|---|
| Carbon black/NR MB | 135.9 | 120.8 | 105.7 |
| NR | 10 | 20 | 30 |
| Silica (Agilon ®400GD) | 5 | 10 | 15 |
| Zinc Oxide | 4 | 4 | 4 |
| Stearic Acid | 2 | 2 | 2 |
| 6PPD* (antioxidant) | 0.5 | 0.5 | 0.5 |
| SantoCure BBTS** | | | |
| Sulfur | | | |

*N-(1,3-dimethylbutyl)-N'-phenyl-p-phenylenediamine
**N-tert-butyl-2-benzothiazole sulfonamide

TABLE 14

Silica Compound Low T Process

| | Time (min) | Operation |
|---|---|---|
| Stage 1 | | Farrel BR Banbury mixer (1600 cc), 70% fill factor, 60 rpm, 60° C.; adjust speed to maintain temperature below 130° C. |
| | 0 | Add rubber-carbon black masterbatch |
| | 0.5 | Add second elastomer material (if used) |
| | 1 | Add pre-coupled silica |
| | 2 | Sweep; Add zinc oxide, stearic acid and 6PPD smalls (preblended) |
| | 2.5 | Dump at 120 to less than 130° C. Roll mill using 6 end rolls, rest at least 3 hours |
| Stage 2 | | Farrel BR Banbury mixer (1600 cc), 65% fill factor, 60 rpm, 50° C. |
| | 0 | Add stage 1 compound, sulfur and accelerator |
| | 0.5 | Sweep |
| | 1 | Dump at < 120° C. Roll mill for one minute with adequate band. Remove and perform 6 end rolls. Sheet off to required thickness. |

TABLE 14

Silica Compound High T Process

| | Time (min) | Operation |
|---|---|---|
| Stage 1 | | Farrel BR Banbury mixer (1600 cc), 70% fill factor, 80 rpm, 80° C.; adjust speed to maintain temperature at or above 130° C. but not to exceed 150° C. |
| | 0 | Add rubber-carbon black masterbatch |
| | 0.5 | Add second elastomer |
| | 1 | Add pre-coupled silica |
| | 2 | Sweep; Add zinc oxide, stearic acid and 6PPD smalls (preblended) |
| | 2.5 | Sweep |
| | 3-4 | Dump; adjust rpm to achieve 140 but not to exceed 150° C. Roll mill using 6 end rolls, rest at least 3 hours |
| Stage 2 | | Farrel BR Banbury mixer (1600 cc), 65% fill factor, 60 rpm, 50° C. |
| | 0 | Add stage 1 compound, sulfur and accelerator |
| | 0.5 | Sweep |
| | 1 | Dump at < 120° C. Roll mill for one minute with adequate band. Remove and perform 6 end rolls. Sheet off to required thickness. |

TABLE 15

MB2 Silica Formulation

| Ingredient | MB2 (1) phr |
|---|---|
| NR | 100 |
| Silica (Zeosil ®1165MP) | 50 |
| Coupling agent (Si69) | 5 |
| 6PPD* (antioxidant) | 1.5 |

*N-(1,3-dimethylbutyl)-N'-phenyl-p-phenylenediamine

TABLE 16

MB2-Silica Masterbatch Process

| | Time (min) | Operation |
|---|---|---|
| Stage 1 | | Farrel BR Banbury mixer (1600 cc), 70% fill factor, 80 rpm, 100° C.; adjust speed to achieve temperature of 150° C. |
| | 0 | Add ½ NR and add silica (preblended with Si69 coupling agent and ½ NR) |
| | 3 | Add antioxidant |
| | 3.5 | Scrape; Sweep |
| | 4 | Dump, adjust temperate to achieve 150° C. Roll mill using 6 end rolls, rest at least 3 hours |

TABLE 17

MB2-Silica Compounds

| Ingredient | No MB2 phr | MB2 phr |
|---|---|---|
| MB | 105.7 | 105.7 |
| NR | 30 | — |
| MB2 | — | 47 |
| Silica (Zeosil ®1165MP) | 15 | — |
| Coupling agent (Si69) | 1.5 | — |
| ZnO | 4 | 4 |
| Stearic acid | 2 | 2 |
| 6PPD* (antioxidant) | 0.5 | — |
| SantoCure CBS** | 0.8 | 0.8 |
| Sulfur | 1.2 | 1.2 |

*N-(1,3-dimethylbutyl)-N'-phenyl-p-phenylenediamine
**N-cyclohexyl-2-benzothiazole sulfonamide

TABLE 18

MB2-Silica Low T Process

| Time (min) | Operation |
|---|---|
| Stage 1 | Farrel BR Banbury mixer (1600 cc), 70% fill factor, 60 rpm, 60° C.; adjust speed to maintain temperature below 130° C. |
| 0 | Add rubber-carbon black masterbatch |
| 0.5 | Add BR or MB2-Silica (when used) |
| 1 | Add Silica, Coupling agent (when used) |
| 2 | Sweep; Add zinc oxide, stearic acid and 6PPD smalls (preblended) |
| 2.5 | Sweep |
| 3 | Dump at 120 to less than 130° C. Roll mill using 6 end rolls, rest at least 3 hours |
| Stage 2 | Farrel BR Banbury mixer (1600 cc), 65% fill factor, 60 rpm, 50° C. |
| 0 | Add stage 1 compound, sulfur and accelerator |
| 0.5 | Sweep |
| 1 | Dump at < 120° C. Roll mill for one minute with adequate band. Remove and perform 6 end rolls. Sheet off to required thickness. |

TABLE 18

MB2-Silica High T Process

| Time (min) | Operation |
|---|---|
| Stage 1 | Farrel BR Banbury mixer (1600 cc), 70% fill factor, 80 rpm, 80° C.; adjust speed to maintain temperature at or above 130° C. but not to exceed 150° C. |
| 0 | Add rubber-carbon black masterbatch |
| 0.5 | Add BR, MB2 (when used) |
| 1 | Add Silica, Coupling agent (when used) |
| 2 | Sweep; Add zinc oxide, stearic acid and 6PPD smalls (preblended) |
| 2.5 | Sweep |
| 3-4 | Dump; adjust rpm to achieve from 140° up to 150° C. Roll mill using 6 end rolls, rest at least 3 hours |
| Stage 2 | Farrel BR Banbury mixer (1600 cc), 65% fill factor, 60 rpm, 50° C. |
| 0 | Add stage one compound, sulfur and accelerator |
| 0.5 | Sweep |
| 1 | Dump at < 120° C. Roll mill for one minute with adequate band. Remove and perform 6 end rolls. Sheet off to required thickness. |

TABLE 19-1

| MB Initial phr CB[a] | Additive[a] Final phr CB/Silica | Mixing Process | Stage 1 Temp. ° C. | Stage 2 Temp. ° C. | Stage 1 Time seconds | Stage 1 Energy kWhr | Mooney (1 + 4) | M300 [MPa] | M300/M100 ratio[-] | Max Tan(δ) 60° C. |
|---|---|---|---|---|---|---|---|---|---|---|
| 6-a MB (A) 50 phr | NR 10phr CB/silica 45/5 phr | 2 Stage Low T | 126 | 77 | 180 | 0.29 | 71.8 | 15.43 | 6.15 | 0.184 |
| 6-d MB (A) 50 phr | NR 10phr CB/silica 45/5 phr | 2 Stage High T | 148 | 77 | 300 | 0.44 | 68.2 | 15.28 | 6.07 | 0.192 |
| 6-b MB (A) 50 phr | NR 20phr CB/silica 40/10 phr | 2 Stage Low T | 128 | 77 | 180 | 0.27 | 69.1 | 13.67 | 6.16 | 0.181 |
| 6-d MB (A) 50 phr | NR 10phr CB/silica 40/10 phr | 2 Stage High T | 148 | 77 | 300 | 0.44 | 68.2 | 15.28 | 6.07 | 0.192 |
| 6-c MB (A) 50 phr | NR 10phr CB/silica 35/15 phr | 2 Stage Low T | 129 | 78 | 180 | 0.27 | 68.4 | 13.31 | 6.12 | 0.164 |
| 6-f MB (A) 50 phr | NR 10phr CB/silica 35/15 phr | 2 Stage High T | 145 | 78 | 300 | 0.41 | 65.5 | 12.78 | 6.12 | 0.151 |

[a]N134 carbon black;
NR elastomer additive;
Agilon ® 0400GD pre-coupled silica filler additive.

TABLE 19-2

| Sample MB Initial phr CB[a] | Elastomer Additive[a] Final phr CB/Silica | Mixing Process | Stage 1 Temp. ° C. | Stage 2 Temp. ° C. | Stage 1 Time seconds | Stage 1 Energy[c] kWhr | Mooney (1 + 4) | M300 [MPa] | M300/M100 ratio[-] | Tear (lbs) |
|---|---|---|---|---|---|---|---|---|---|---|
| 6 (11-f) MB (B) 50 phr | MB2[b] NR/Silica CB + Silica 50 phr | 2 Stage Low T | 115 | 95 | 180 | NA | 61.1 | 16.09 | 6.42 | 162 |
| 11(11-k) MB (B) 50 phr | MB2[b] NR/Silica CB + Silica 50 phr | 2 Stage High T | 138 | 90 | 210 | NA | 58.5 | 16.62 | 6.22 | 155 |

TABLE 19-2-continued

| Sample MB Initial phr CB[a] | Elastomer Additive[a] Final phr CB/Silica | Mixing Process | Stage 1 Temp. °C. | Stage 2 Temp. °C. | Stage 1 Time seconds | Stage 1 Energy[c] kWhr | Mooney (1 + 4) | M300 [MPa] | M300/M100 ratio[-] | Tear (lbs) |
|---|---|---|---|---|---|---|---|---|---|---|
| 7(11-g) MB (B) 50 phr | NR Silica CB + Silica 50 phr | 2 Stage High T | 146 | 96 | 180 | NA | 70.6 | 15.11 | 6.28 | 155 |

[a]Propel ® E7 carbon black;
NR elastomer additive;
Zeosil ® 1165MP silica, with Si69 coupling agent.
[b]MB2 contained 50phr Zeosil ® 1165MP silica in NR, 5 phr Si69 coupler and 1.5 phr antioxidant (6PPD).
[c]Energy input data were not recorded for Stage 1 mixing, but they generally tracked Stage 1 mixing time.

Results

Data in Table 19-1 demonstrate that the Low T process produces elastomer compounds with silica filler additive having improved hysteresis and mechanical reinforcement properties than the High T process at final compound silica content of up to 10 phr silica. At higher silica content, i.e., 15 phr silica that is mixed without using a MB2 additive, the benefit of the Low T process is less apparent and hysteresis and mechanical reinforcement properties of the elastomer compound produced become equivalent to those produced by the High T process.

Date in Table 19-2 demonstrate that utilizing a MB2 additive wherein the elastomer and silica are pre-blended at a temperature of at least 130 deg C., the Low T process for compounding MB with such a MB2 yielded improved M300, M300/M100 and Tear mechanical reinforcement properties relative to the High T process. As noted above, a High T process sample made with 15 phr silica and NR that had not been blended into a MB2 (i.e., sample 7(11-g) had less favorable mechanical reinforcement properties. Thus, improved silica compounds were made from a blend of MB and MB2, relative to an equivalent, comparable blend made without MB2, in the process of the invention.

Carbon black dispersion was acceptable in all samples (i.e., less than 10% undispersed area of carbon black particles of at least 10 micrometers in a largest dimension). Mooney viscosity data confirm the Low T process and the blended elastomer compounds made by the process are satisfactory for use of the compounds in further processing operations for fabricating finished rubber articles. Overall, these data demonstrate the Low T process for dry mixing silica containing compounds with MB, particularly when a MB2 additive is selected for higher silica content compounds, is a more energy efficient process capable of producing improved, and/or equivalent elastomeric compounds relative to those made by conventional, less efficient mixing processes.

While this invention has been particularly shown and described with references to preferred implementations thereof, it will be understood by those skilled in the art that various changes in form and details may be made therein without departing from the scope of the invention encompassed by the appended claims.

Applicant specifically incorporates the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method to prepare an elastomer composite masterbatch, comprising:

dry mixing in a multi-stage mixing process, an elastomer composite masterbatch with at least one additive at a process temperature to obtain an elastomer compound, wherein a) wherein when the multi-stage mixing process is a two stage mixing process, the process temperature in stage one of the two stage mixing process is below 130 deg C. in stage one and is from 90 deg C. to 120 deg C. in stage two of the two stage mixing process when a curative agent is present in stage two of the two stage mixing, and b) wherein when the multi-stage mixing process has two or more mixing stages in the multi-stage mixing process, the process temperature is below 130 deg C. in stage one of a multi-stage mixing process and is below 130 deg C. in subsequent stages of the multi-stage mixing process when a curative agent is not present in the subsequent stages of the multi-stage mixing process; and c) wherein when the multi-stage mixing process has two or more mixing stages in the multi-stage mixing process, the process temperature is below 130 deg C. in stage one of a multi-stage mixing process and is from 90 to below 120 deg C. in subsequent stages of the multi-stage mixing process when a curative agent is present in the subsequent stages of the multi-stage mixing process, and wherein the elastomer composite masterbatch is a masterbatch having a macrodispersion with a percentage of undispersed areas of filler of 2% or lower.

2. The method of claim 1, wherein, prior to said dry mixing, the method further comprises:
a) dewatering the elastomer composite masterbatch;
b) masticating the elastomer composite masterbatch to obtain a mechanically worked dry elastomer composite in the form of strips;
c) baling the strips of mechanically worked dry elastomer composite to obtain a baled product; and
d) optionally breaking apart the baled product and conducting said dry mixing process.

3. The method of claim 1, wherein the at least one additive is carbon black, silica-treated carbon black, silica coated carbon black, precipitated silica, treated silica, fumed silica, zinc oxide, aluminum oxide, calcium carbonate, metal oxide, or any combinations thereof.

4. The method of claim 1, wherein the elastomer composite masterbatch comprises natural rubber latex, synthetic rubber latex, synthetic rubber solution, or combinations thereof.

5. The method of claim 1, wherein the at least one additive comprises fillers, elastomers, curing agents, processing oils, antioxidants, antiozonants, plasticizers, resins, flame-retardants, extender oils, lubricants, or any combination thereof.

6. The method of claim 1, wherein the at least one additive comprises at least one additional elastomer.

7. The method of claim 1, wherein the at least one additive is at least two additives, and one of the at least two additives is at least one filler.

8. The method of claim 1, wherein the at least one additive comprises a second elastomer masterbatch of at least one additional elastomer and particulate filler.

9. The method of claim 1, wherein said elastomer composite masterbatch, prior to said dry mixing, has a percentage of undispersed area of filler particles of 1% or less of filler particles of at least 10 micrometers in a largest dimension.

10. The method of claim 1, wherein at least one filler is present in the elastomer composite masterbatch, prior to said dry mixing, at a loading of 5 to 80 phr.

11. The method of claim 1, wherein, prior to said dry mixing, the method further comprises dewatering and drying the elastomer composite masterbatch and, during or after drying the elastomer composite masterbatch, blending at least one additional additive with the elastomer composite masterbatch.

12. The method of claim 1, wherein the at least one additive is two or more additives present in at least one mixture.

13. The method of claim 1, wherein the at least one additive is added in the form of a second elastomer masterbatch.

14. The method of claim 1, for any of a), b), or c), wherein said process temperature when said curative agent is not present is from 90 to 129 deg C.

15. The method of claim 1, wherein said elastomer composite masterbatch comprises natural rubber latex and said at least one additive comprises at least one elastomer, wherein said at least one elastomer is present in an amount of from 20 wt % to 80 wt % of total elastomer present in the elastomer compound.

16. The method of claim 1, wherein in said stage one for any of a), b), or c), an applied energy during said dry mixing is reduced by at least 10-50% and a mixing time is reduced by at least 10-60% while achieving at least equivalent mechanical and dynamic properties in the elastomer compound as compared to the same process but mixing in stage one at a temperature of at least 130 deg C, and wherein said elastomer compound after said two stage mixing or multi-stage mixing has a Mooney viscosity value of from about 65 to 90.

* * * * *